US012189716B1

(12) United States Patent
Liao et al.

(10) Patent No.: US 12,189,716 B1
(45) Date of Patent: Jan. 7, 2025

(54) PREDICTING LIKELIHOOD OF REQUEST CLASSIFICATIONS USING DEEP LEARNING

(71) Applicant: SAS Institute Inc., Cary, NC (US)

(72) Inventors: Yi Liao, Apex, NC (US); Artin Armagan, Raleigh, NC (US); Phoemphun Oothongsap, Raleigh, NC (US); Brian Christopher Hare, Raleigh, NC (US); Adheesha Sanjaya Arangala, Chapel Hill, NC (US); Jin-Whan Jung, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/672,589

(22) Filed: May 23, 2024

Related U.S. Application Data

(60) Provisional application No. 63/557,973, filed on Feb. 26, 2024.

(51) Int. Cl.
*G06N 3/086* (2023.01)
*G06F 18/21* (2023.01)
*G06F 18/214* (2023.01)
*G06F 18/22* (2023.01)
*G06N 3/045* (2023.01)
*G06N 3/084* (2023.01)

(52) U.S. Cl.
CPC .......... *G06F 18/214* (2023.01); *G06F 18/217* (2023.01)

(58) Field of Classification Search
CPC .............................. G06F 18/214; G06F 18/217
See application file for complete search history.

(56) References Cited

U.S. PATENT DOCUMENTS

| | | | | |
|---|---|---|---|---|
| 10,831,452 | B1* | 11/2020 | Hunter | G06N 5/01 |
| 11,094,413 | B1* | 8/2021 | Golenski | G16H 50/30 |
| 2015/0254555 | A1* | 9/2015 | Williams, Jr. | G06N 3/045 |
| | | | | 706/14 |
| 2021/0073282 | A1* | 3/2021 | Hunter | G06F 8/33 |

(Continued)

OTHER PUBLICATIONS

Branco, Bernardo, et al. "Interleaved sequence RNNs for fraud detection." Proceedings of the 26th ACM SIGKDD international conference on knowledge discovery & data mining. 2020.

(Continued)

*Primary Examiner* — Brandon S Cole
(74) *Attorney, Agent, or Firm* — Bell & Manning, LLC

(57) ABSTRACT

A system and method include receiving a first set of variables associated with a real-time request, extracting a predetermined subset of the first set of variables for generating a second set of variables, identifying historical request data, computing a set of parameters based on the first set of variables and the historical request data, generating a plurality of numeric sequences and a plurality of string sequences for the real-time request, converting each of the plurality of string sequences into an encoded string sequence to obtain a plurality of encoded string sequences, inputting the plurality of numeric sequences and the plurality of encoded string sequences into a trained deep machine learning model, and computing a score from the trained deep machine learning model, the score indicative of a likelihood that the real-time request belongs to an unauthorized classification.

30 Claims, 24 Drawing Sheets

(56) References Cited

U.S. PATENT DOCUMENTS

2021/0141897 A1\* 5/2021 Seifert .................. G06F 21/561

OTHER PUBLICATIONS

Staudemeyer, Ralf C., Morris, Eric Rothstein, Understanding LSTM—a tutorial into Long Short-Term Memory Recurrent Neural Networks, Sep. 2019.
R. Dey and F. M. Salem, "Gate-variants of gated recurrent unit (GRU) neural networks", Proc. IEEE 60th Int. Midwest Symp. Circuits Syst. (MWSCAS), pp. 1597-1600, Aug. 2017.
Vaswani Ashish, Shazeer Noam, Parmar Niki, Uszkoreit Jakob, Jones Llion, Gomez Aidan N., Kaiser Łukasz, and Polosukhin Illia, "Attention is all you need", Advances in Neural Information Processing Systems, pp. 5998-6008. Dec. 2017.

\* cited by examiner

PREDICTING LIKELIHOOD OF REQUEST CLASSIFICATIONS USING DEEP LEARNING

CROSS-REFERENCE TO RELATED APPLICATIONS

This application is a non-provisional of U.S. provisional patent application No. 63/557,973, filed on Feb. 26, 2024, the entirety of which is incorporated by reference herein.

BACKGROUND

Artificial intelligence and machine learning algorithms have been gaining popularity in a wide range of applications. Many entities and organizations employ such algorithms to detect unauthorized/unapproved, outlier, out of range, suspicious, fraudulent, or otherwise abnormal or rare activities. These machine learning algorithms rely on feature engineering in which a set of inputs or "features" are extracted from raw data. These "features" are then used to develop an analytical model to predict and/or detect the atypical activity. Feature engineering is computation intensive, slow, requires tremendous amounts of storage space, and is otherwise limited in configuration and operation.

SUMMARY

In accordance with at least some aspects of the present disclosure, a non-transitory computer-readable medium having computer-readable instructions stored thereon is disclosed. The computer-readable instructions when executed by a processor cause the processor to receive a first set of variables associated with a real-time request, extract a predetermined subset of the first set of variables to generate a second set of variables for the real-time request, identify historical request data associated with a predetermined number of historical requests, wherein the historical requests are identified based on the real-time request, compute a set of parameters based on the first set of variables and the historical request data, generate a plurality of sequences for the real-time request, wherein the plurality of sequences comprise a plurality of numeric sequences and a plurality of string sequences, wherein each of the plurality of numeric sequences and each of the plurality of string sequences comprises a plurality of values of a specific attribute type, and wherein the plurality of values are selected from the second set of variables, the set of parameters, and the historical request data, convert each of the plurality of string sequences into an encoded string sequence to obtain a plurality of encoded string sequences, input the plurality of numeric sequences and the plurality of encoded string sequences into a trained deep machine learning model, and compute a score from the trained deep machine learning model, the score indicative of a likelihood that the real-time request belongs to an unauthorized classification.

In accordance with at least some other aspects of the present disclosure, a system is disclosed. The system includes a memory having computer-readable instructions stored thereon and a processor that executes the computer-readable instructions to receive a first set of variables associated with a real-time request, extract a predetermined subset of the first set of variables to generate a second set of variables for the real-time request, identify historical request data associated with a predetermined number of historical requests, wherein the historical requests are identified based on the real-time request, compute a set of parameters based on the first set of variables and the historical request data, generate a plurality of sequences for the real-time request, wherein the plurality of sequences comprise a plurality of numeric sequences and a plurality of string sequences, wherein each of the plurality of numeric sequences and each of the plurality of string sequences comprises a plurality of values of a specific attribute type, and wherein the plurality of values are selected from the second set of variables, the set of parameters, and the historical request data, convert each of the plurality of string sequences into an encoded string sequence to obtain a plurality of encoded string sequences, input the plurality of numeric sequences and the plurality of encoded string sequences into a trained deep machine learning model, and compute a score from the trained deep machine learning model, the score indicative of a likelihood that the real-time request belongs to an unauthorized classification.

In accordance with at least some other aspects of the present disclosure, a method is disclosed. The method includes receiving, by a processor executing computer-readable instructions stored on a memory, a first set of variables associated with a real-time request, extracting, by the processor, a predetermined subset of the first set of variables for generating a second set of variables for the real-time request, identifying, by the processor, historical request data associated with a predetermined number of historical requests, wherein the historical requests are identified based on the real-time request, computing, by the processor, a set of parameters based on the first set of variables and the historical request data, generating, by the processor, a plurality of sequences for the real-time request, wherein the plurality of sequences comprise a plurality of numeric sequences and a plurality of string sequences, wherein each of the plurality of numeric sequences and each of the plurality of string sequences comprises a plurality of values of a specific attribute type, and wherein the plurality of values are selected from the second set of variables, the set of parameters, and the historical request data, converting, by the processor. each of the plurality of string sequences into an encoded string sequence for obtaining a plurality of encoded string sequences, inputting, by the processor, the plurality of numeric sequences and the plurality of encoded string sequences into a trained deep machine learning model, and computing, by the processor, a score from the deep machine learning model, the score indicative of a likelihood that the real-time request belongs to an unauthorized classification.

The foregoing summary is illustrative only and is not intended to be limiting in any way. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
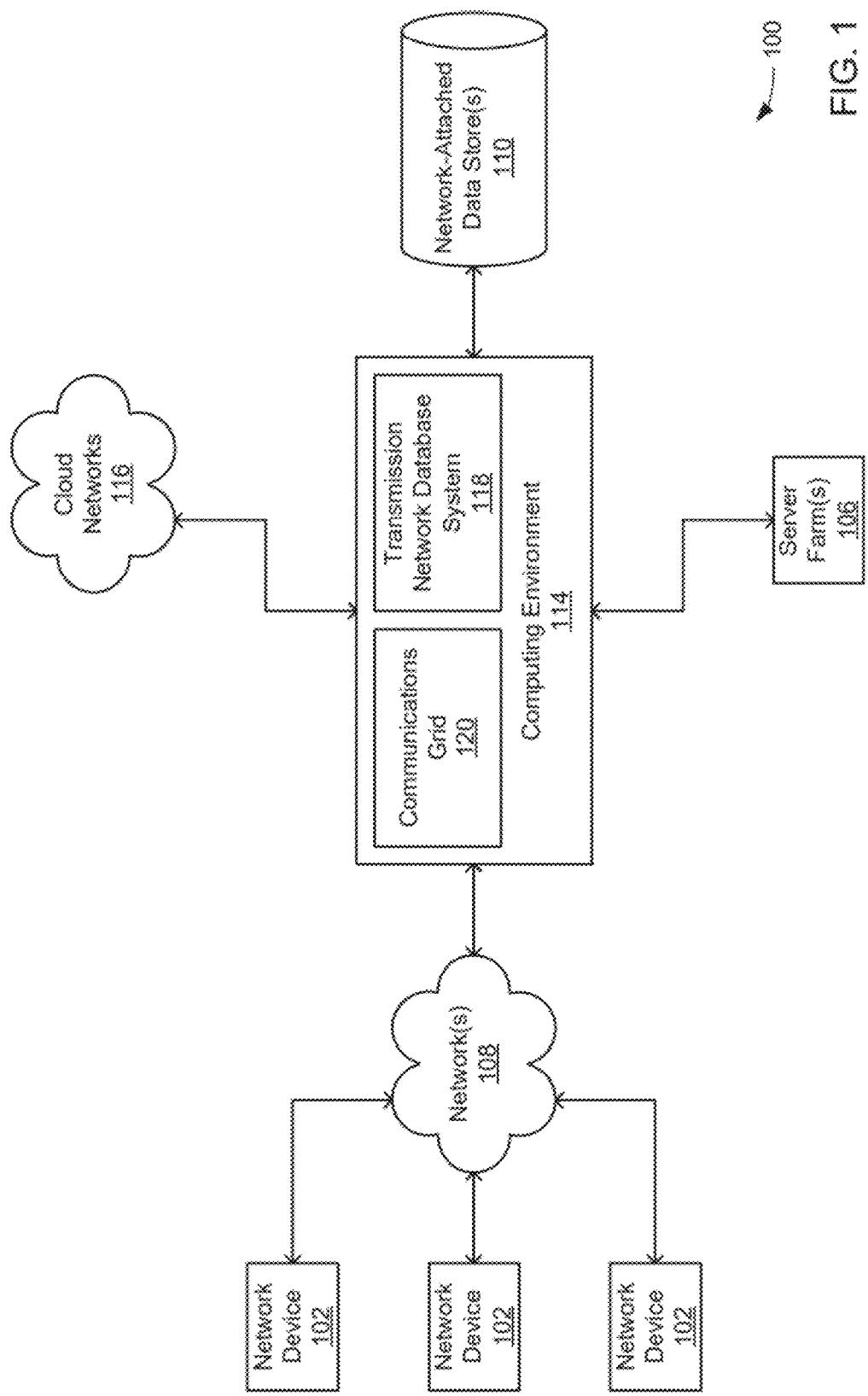
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
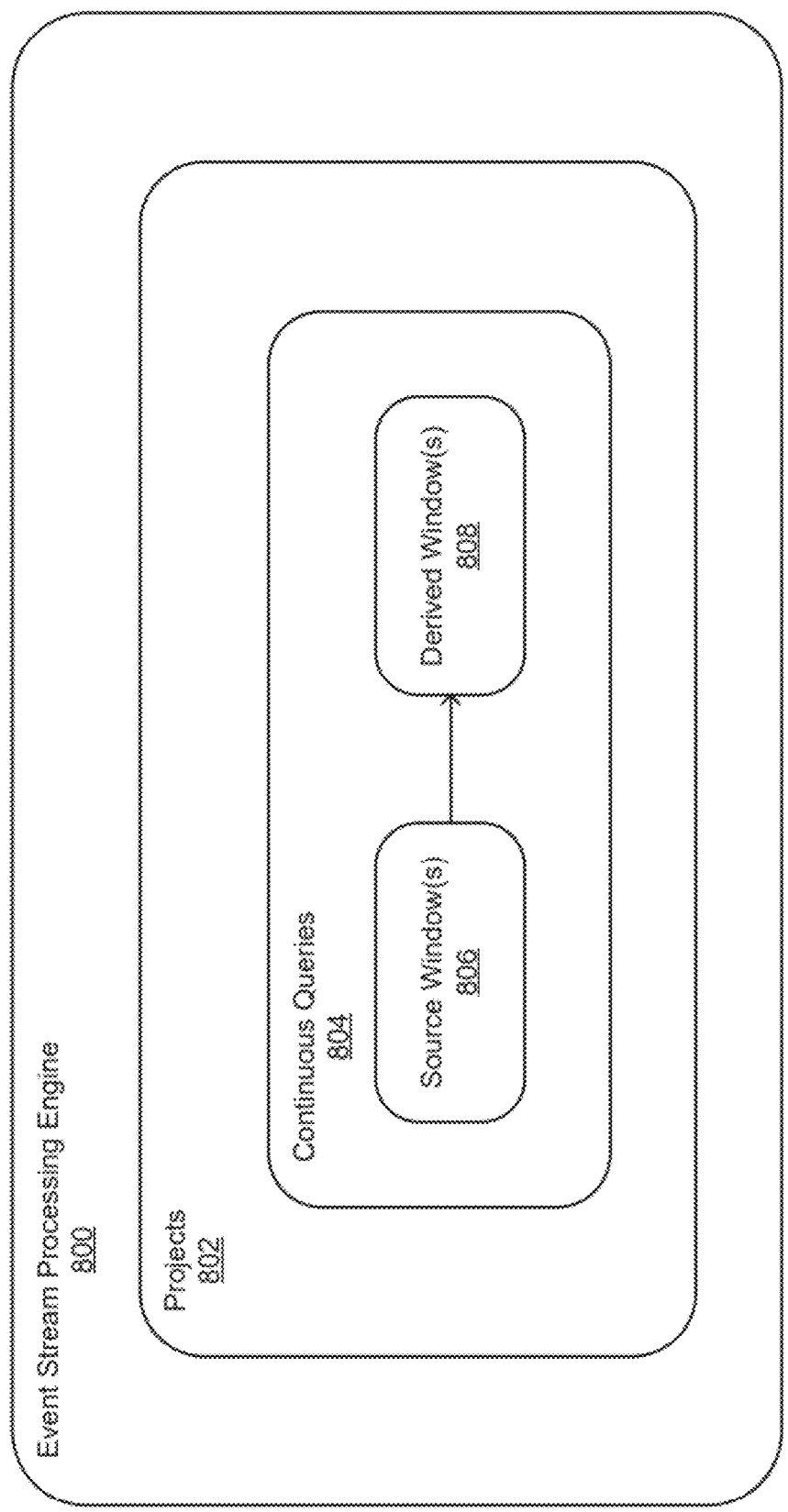
FIG. 8 illustrates a block diagram including components of an Event Stream Processing Engine (ESPE), according to embodiments of the present technology.
Figure 9:
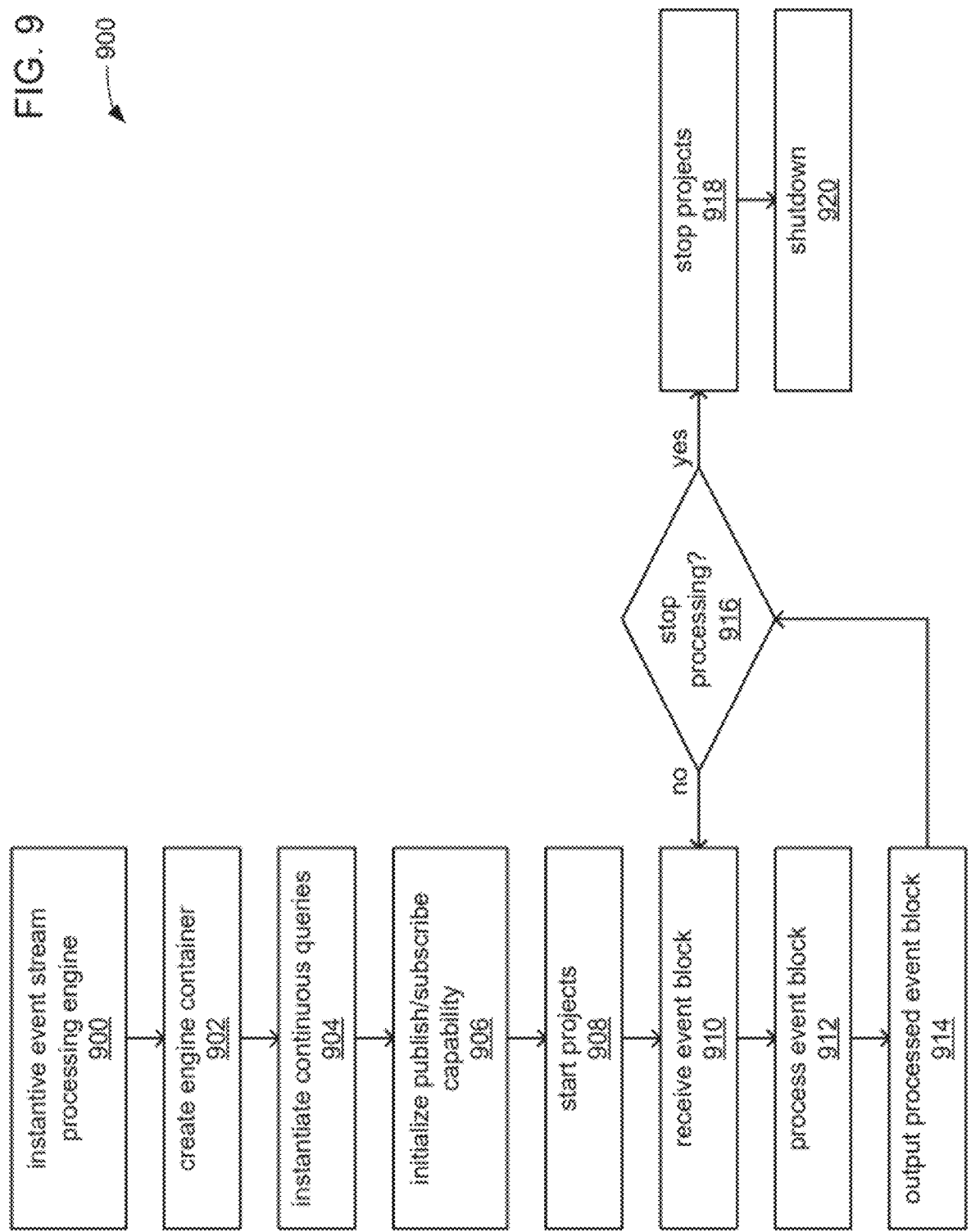
FIG. 9 illustrates a flow chart showing an example process including operations performed by an event stream processing engine, according to some embodiments of the present technology.
Figure 10:
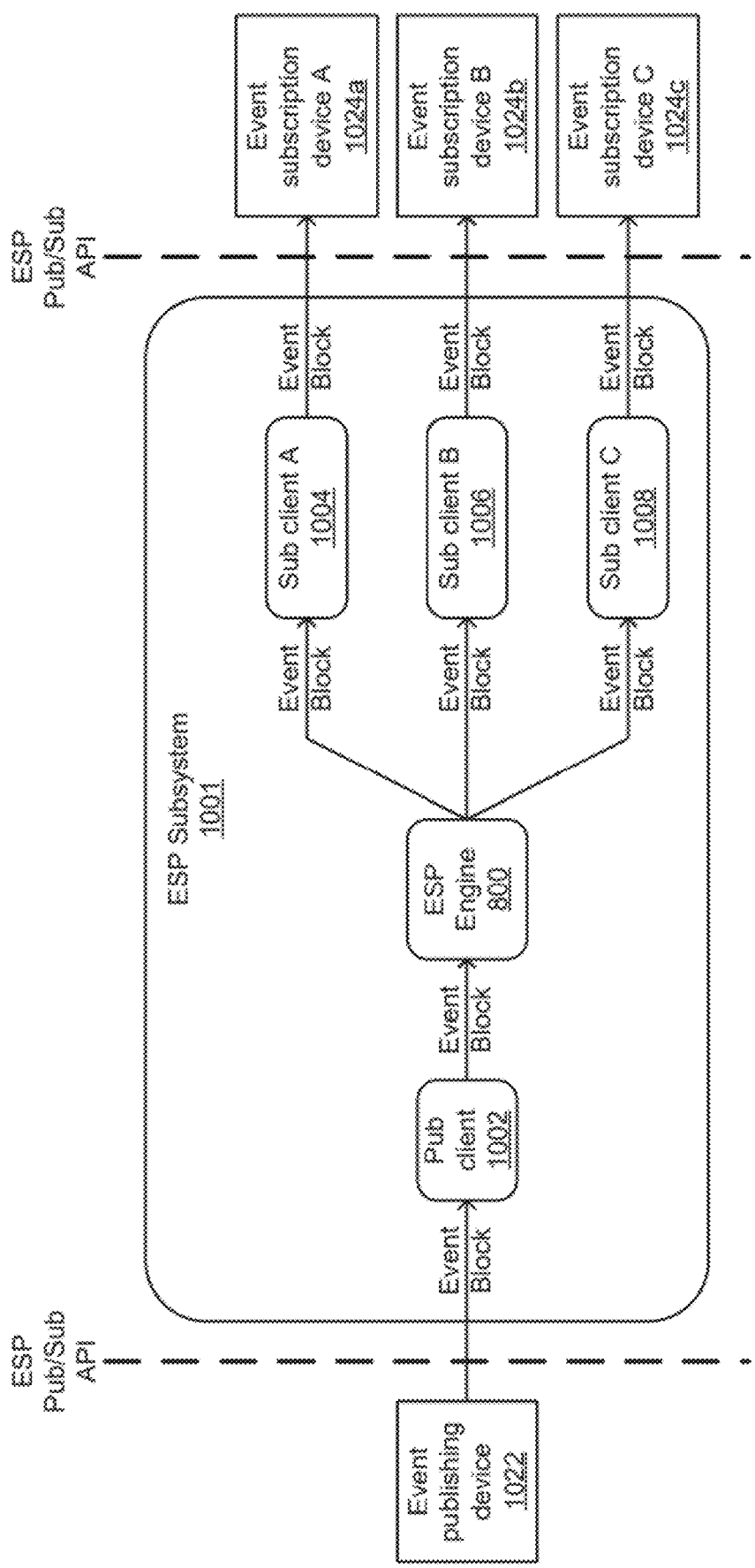
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication.

Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
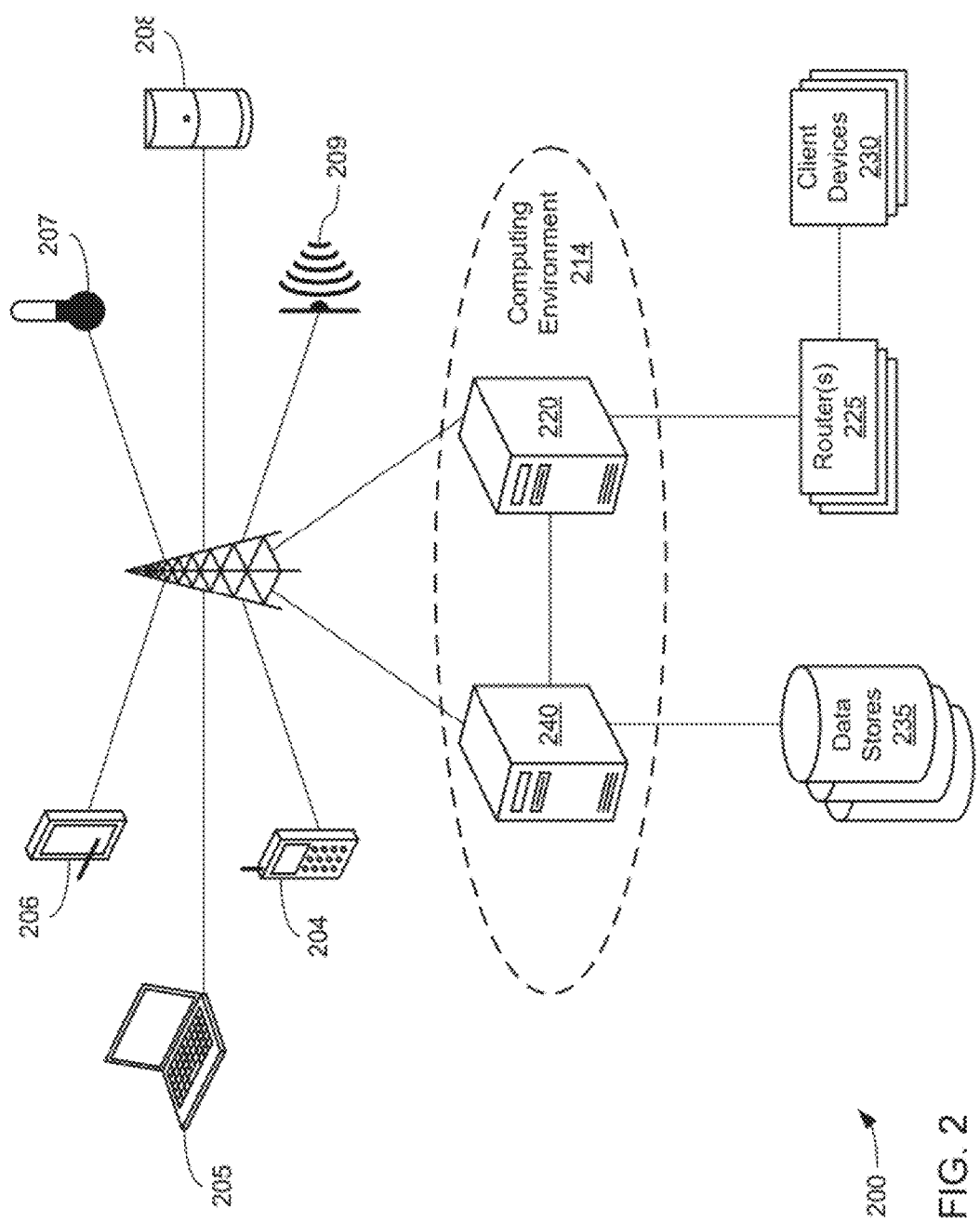
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
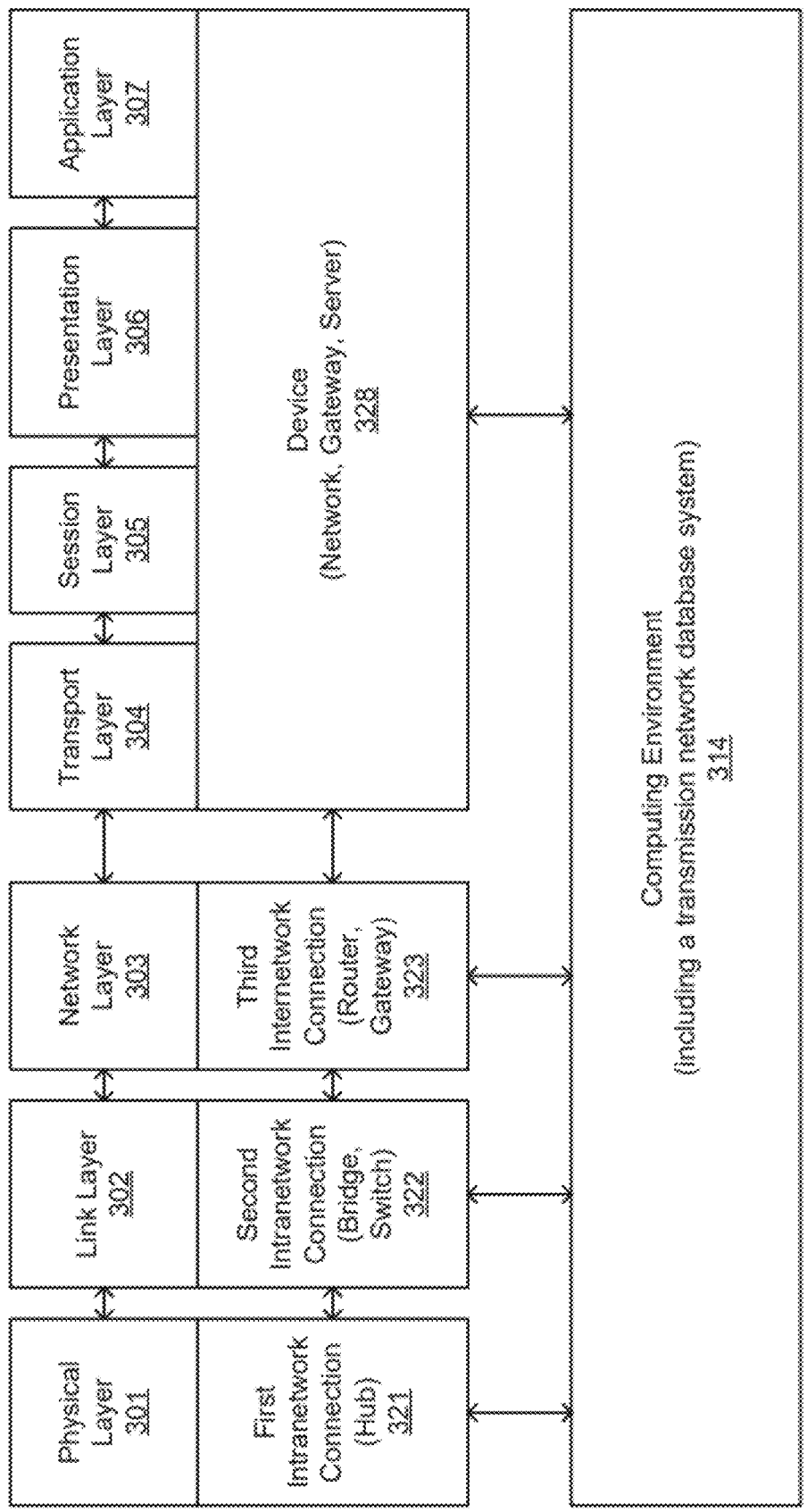
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
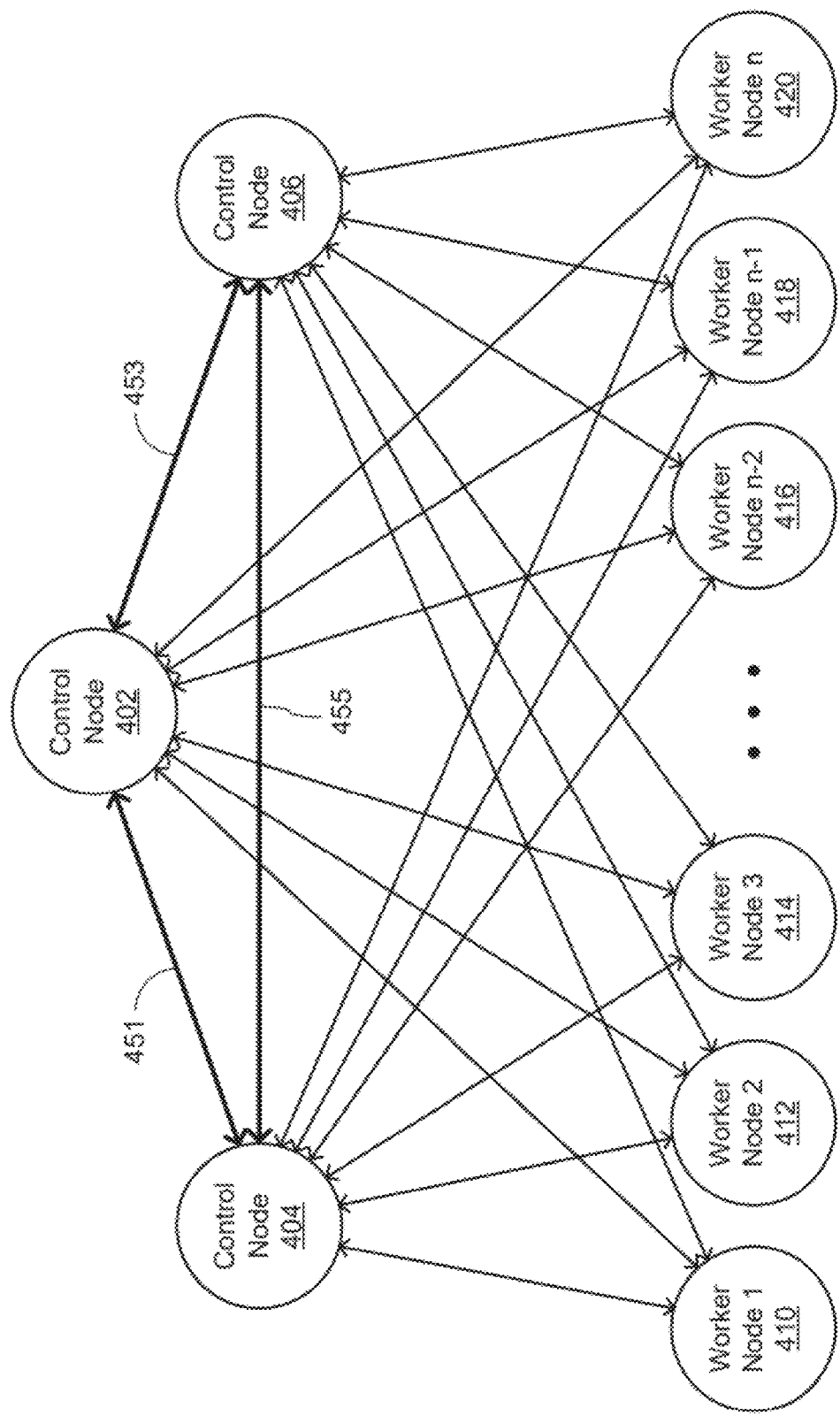
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
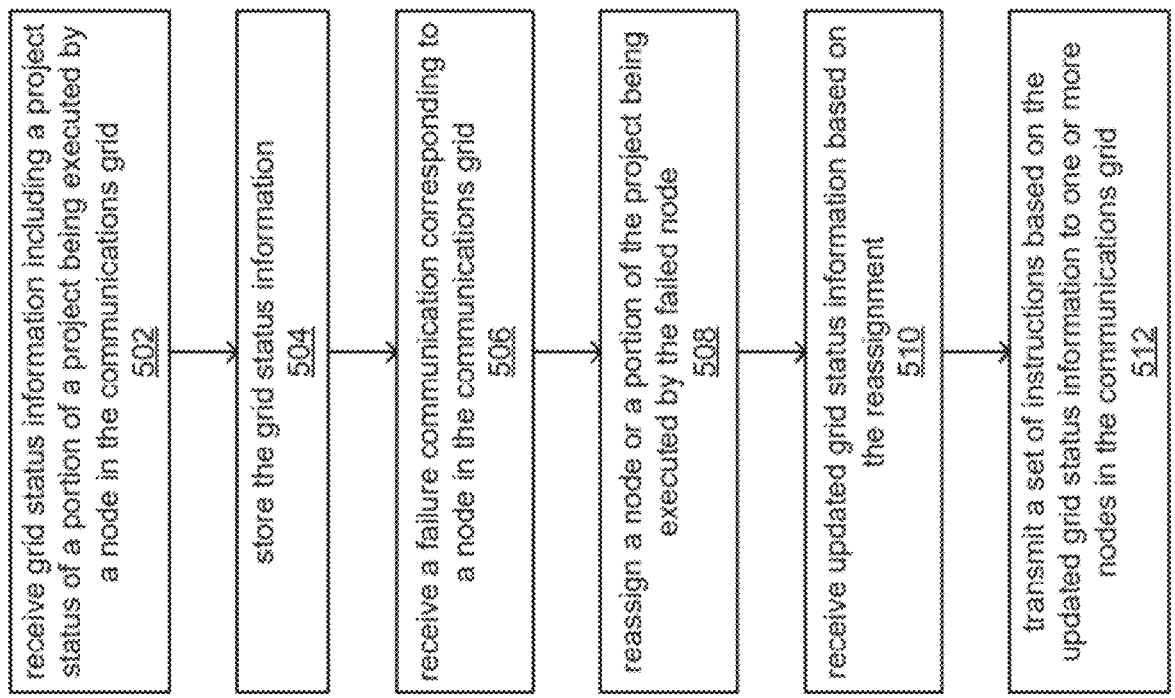
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
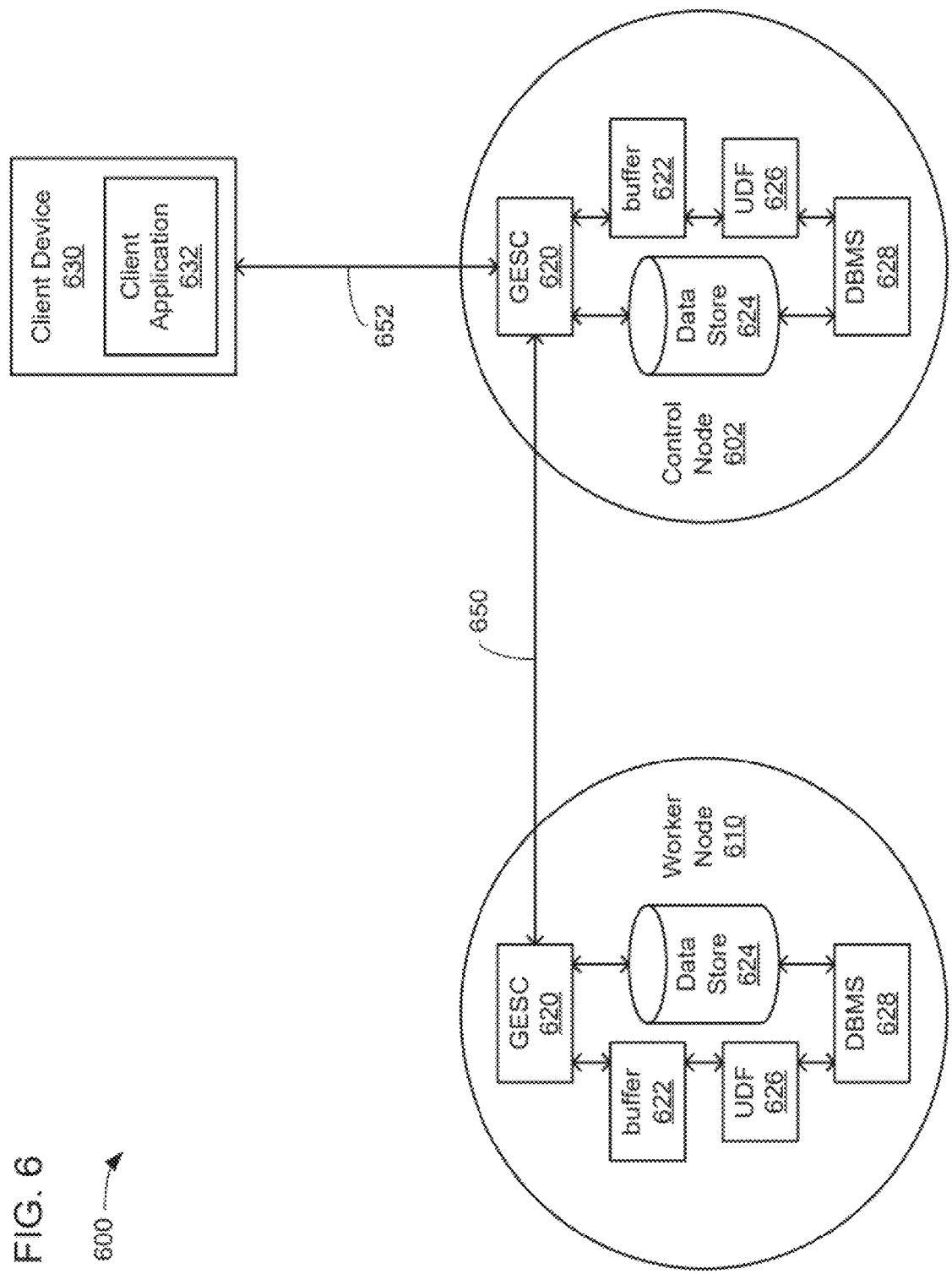
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
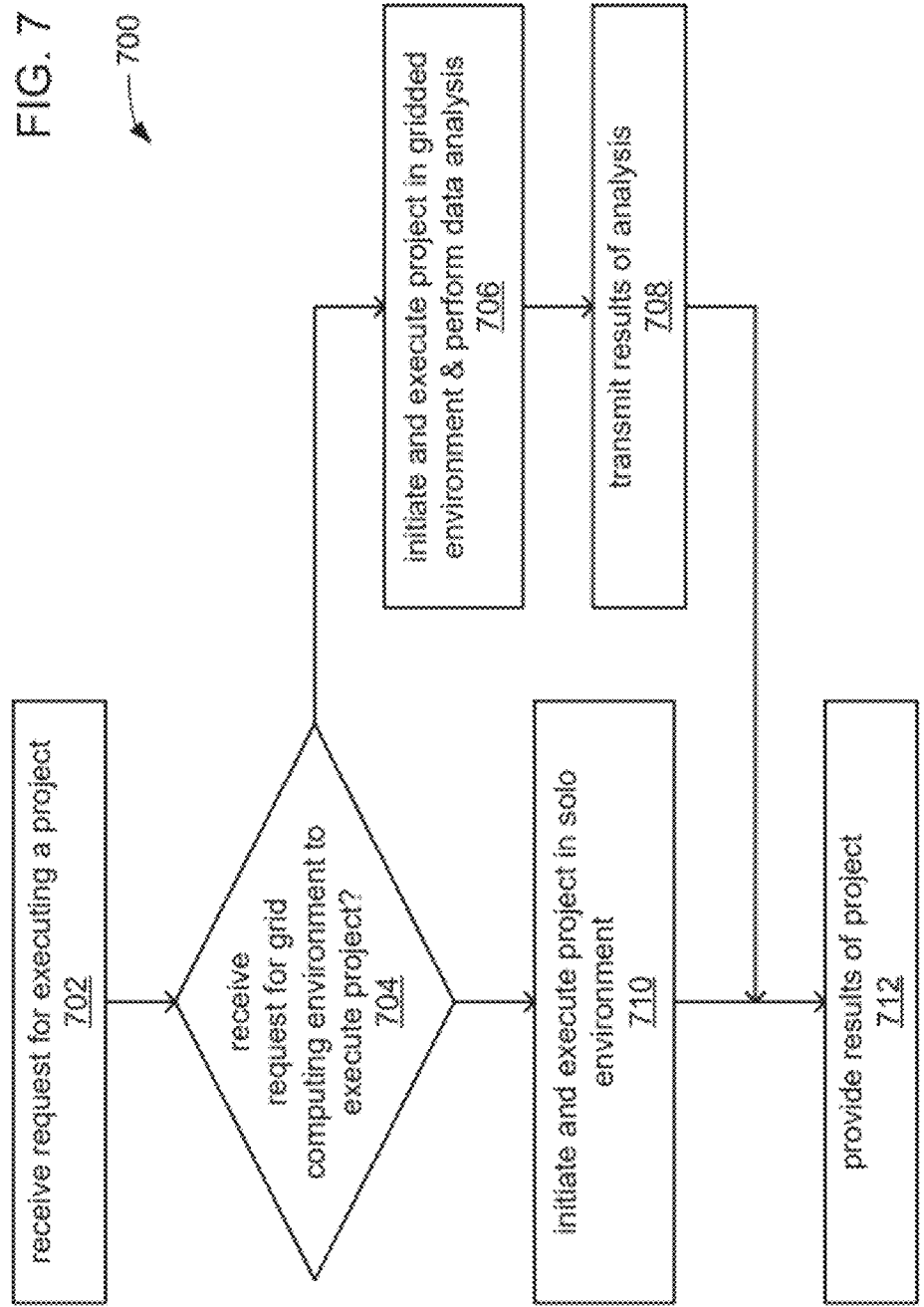
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device.

The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
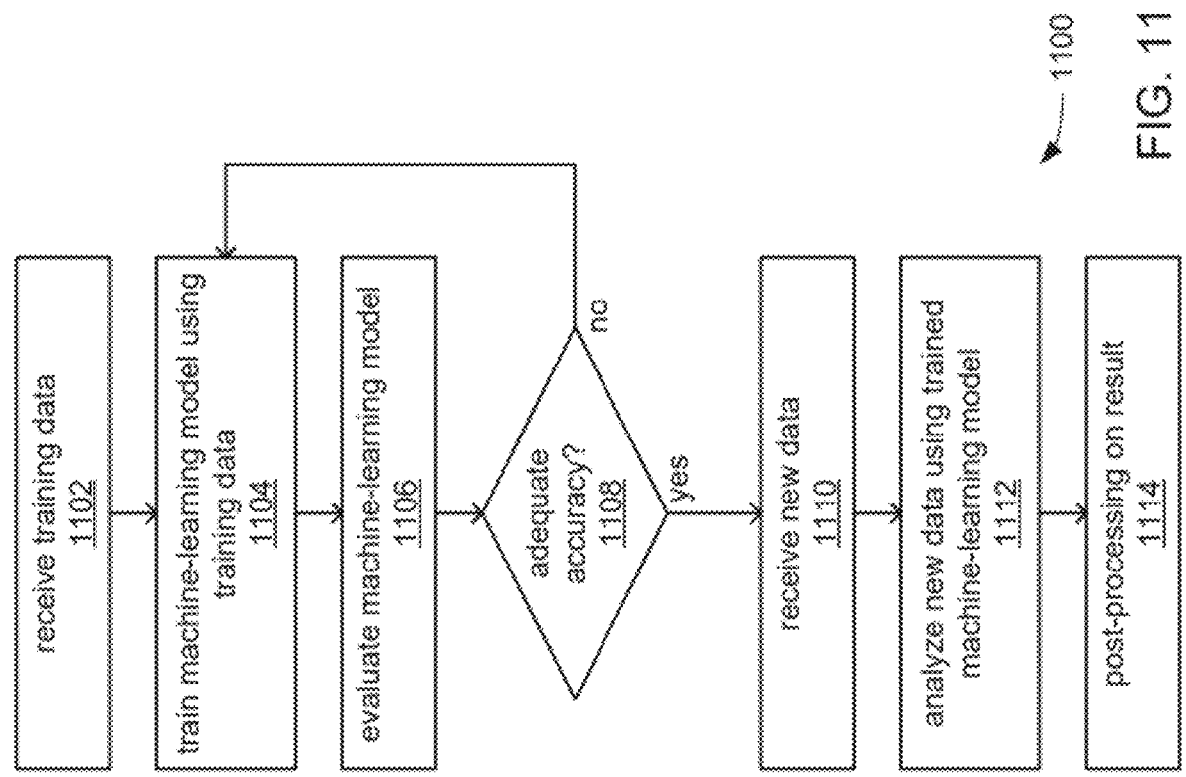
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
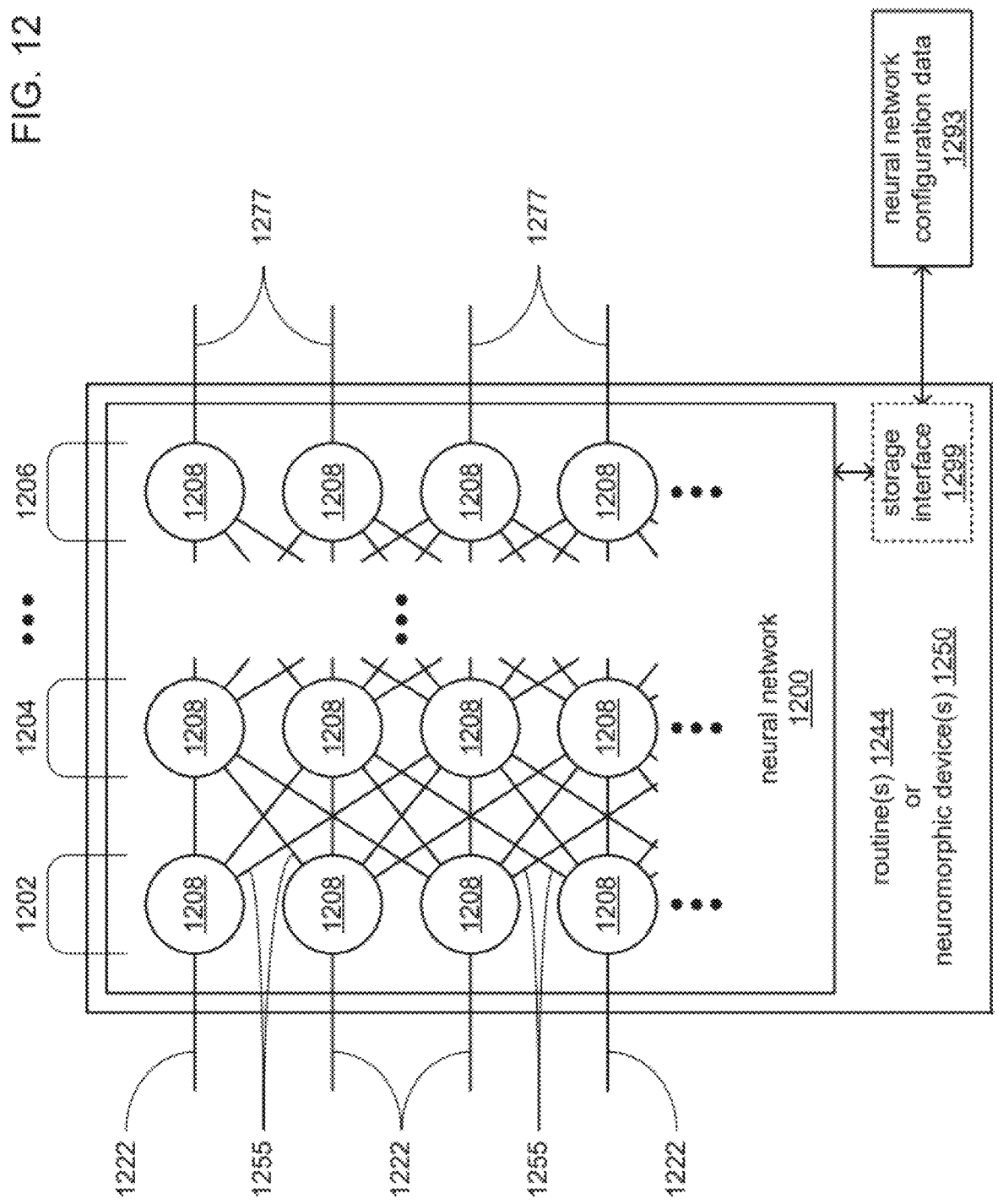
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
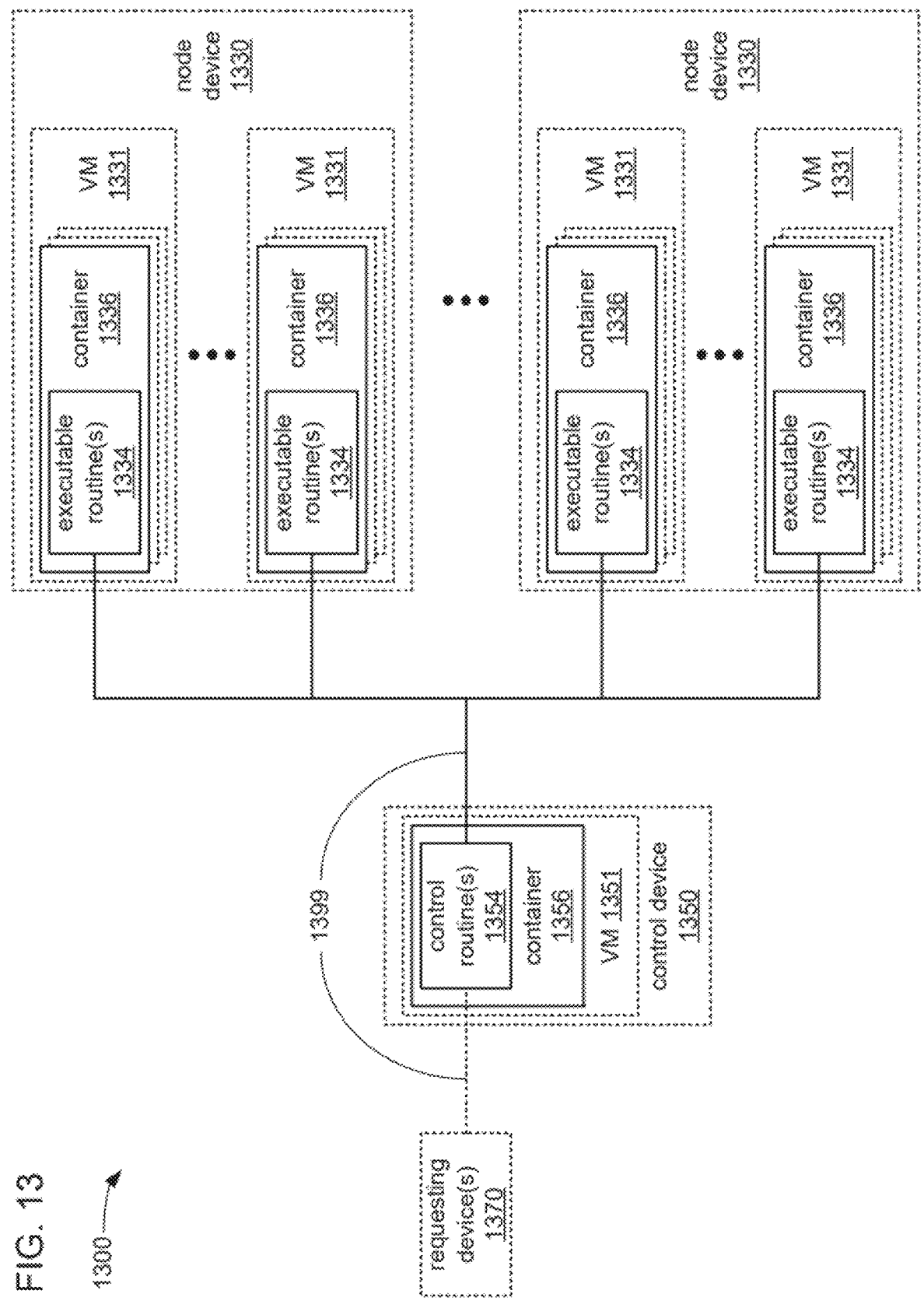
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to a deep learning detection system that is configured to predict the likelihood that a request belongs to a particular classification. In particular, the present disclosure is directed to building or training a machine learning analytical model that is configured to predict the likelihood that the request belongs to the particular classification. Traditionally, feature engineering is used to build or train such machine learning analytical models. Feature engineering involves a team of modelers (e.g., people trained to perform feature engineering and/or build feature engineering models) that engineer tens of thousands of initial features from raw data. These initial features may represent variables that may be considered relevant for a particular prediction. From these initial features, the modelers may select a few hundred features to create a final set of features. The final set of features may be used as inputs for building or training a machine learning analytical model such as a random forest, gradient boosting tree, or other tree based neural networks.

Building or training a machine learning analytical model using feature engineering is computation intensive due to required creation of tens of thousands of the initial features and building the final set of features. The process to build the final set of features may be iterative and each iteration may take weeks to complete. Thus, feature engineering is also time intensive. Further, as indicated above, the initial features may include tens of thousands of variables, which consume a lot of storage space. Additionally, the accuracy of the prediction using a machine learning analytical model built using feature engineering is highly dependent upon the quality of the final set of features, which is directly correlated to the experience level of the modelers tasked with creating these features. Because of the manual nature of feature engineering, the process of building the machine learning analytical model is error prone. Therefore, feature engineering is computationally intensive, time intensive, slow, requires an inordinate amount of storage, error prone, and may lack accuracy in predictions.

Moreover, the tree based neural networks generally used in feature engineering are more suitable for data that is in the form of tabular form. Feature engineering often ignores other aspects of the data. For example, feature engineering may ignore the fact that data may sometimes be in the form of sequences. Because feature engineering ignores the sequence nature of data, feature engineering cannot leverage the information that such sequences may provide. The sequence nature of data may be useful and/or important in increasing the accuracy of prediction. For at least this reason, recent advances in artificial intelligence and machine learning have made feature engineering obsolete in certain areas. For example, convolutional neural networks used in computer vision and transformer models may be preferable to use in certain types of applications where higher accuracy of prediction is desired. Thus, while feature engineering may be suitable for some types of applications, feature engineering may be less suitable for other types of applications. Thus, the traditional feature engineering approach suffers from several disadvantages.

The present disclosure provides technical solutions that provide an accurate prediction of the likelihood that a particular request belongs to a certain classification. Specifically, the present disclosure provides a mechanism to use deep learning instead of feature engineering to offer technical improvement over the feature engineering approach. For example, the present disclosure provides a mechanism to build a deep machine learning model that provides better performance than feature engineering. In particular, the proposed approach is computationally less intensive than feature engineering (e.g., because the proposed approach does not require generating the features), takes less time to build or train the machine learning analytical model (e.g., because the proposed model may be built automatically without requiring weeks of manual labor), provides accurate predictions (e.g., because the proposed approach leverages the sequence nature of data), requires significantly less storage (e.g., due to no features that need to be stored), provides predictions in real-time (or substantially real-time) such as under tens of milliseconds, and is much easier to use. Further, the proposed approach uses more advanced forms of neural networks such as transformer models or recurrent neural networks, which are more suitable for handling data that is in sequence form. By using the transformer models or the recurrent neural networks, the proposed approach increases the accuracy of prediction because, by taking advantage of the sequence nature of data, the transformer models or the recurrent neural networks may consider historical information to inform future predictions.

Figure 14:
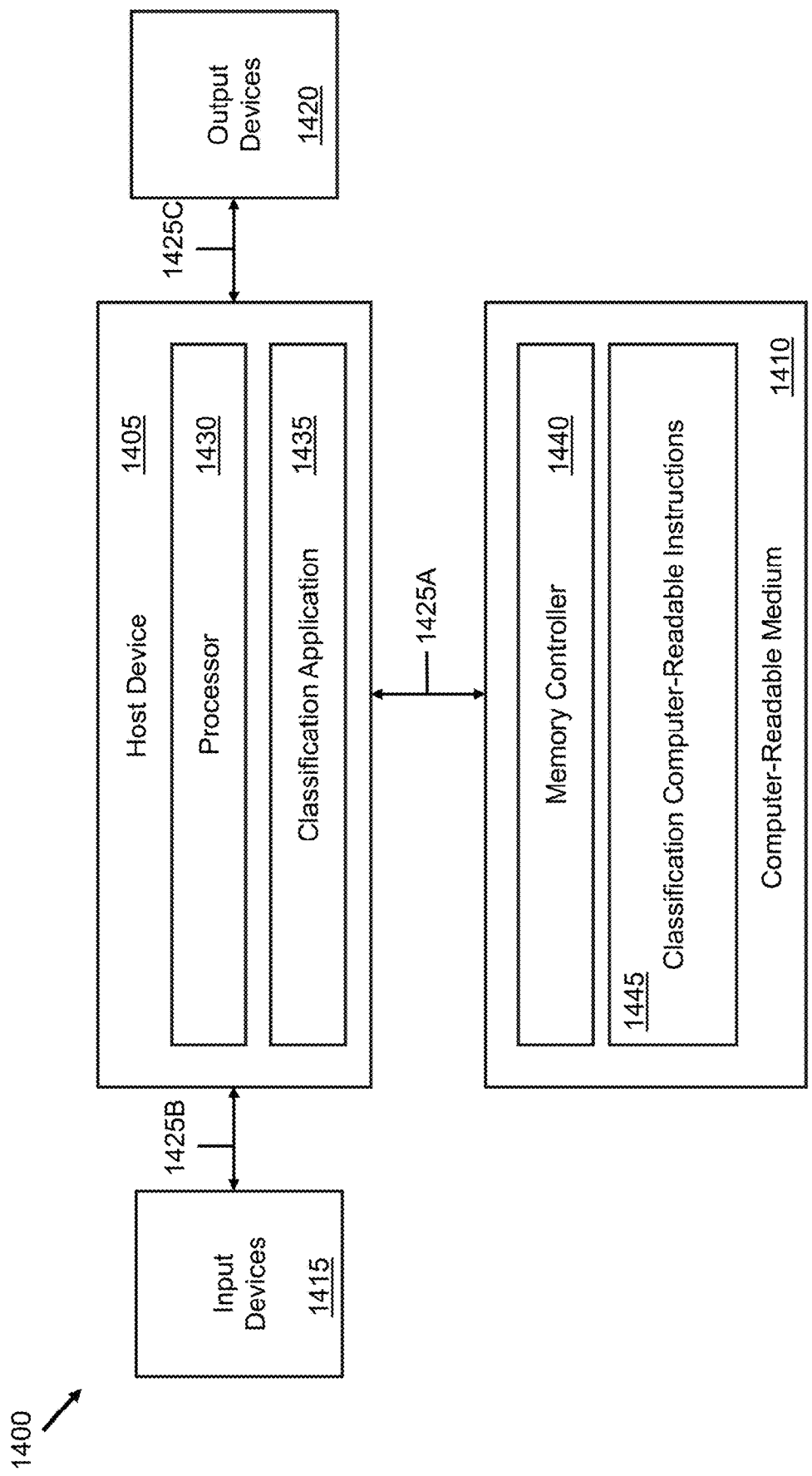
FIG. 14 illustrates a block diagram of an example classification system, according to embodiments of the present technology.

Turning now to FIG. 14, a block diagram of an example classification system 1400 is shown, in accordance with some embodiments of the present disclosure. The classification system 1400 may be part of, or otherwise associated with, the computing environment 114. The classification system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The classification system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the classification system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the classification system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a classification application 1435. The classification application 1435 may be used to train a deep machine learning model to predict the probability (also referred to herein as "likelihood" or other like terms) that a request belongs to a particular classification. The classification application 1435 may also be used to use the trained deep machine learning model to predict the likelihood that a real-time request belongs to a particular classification. Based on the predicted probability of the classification of the real-time request, the classification application 1435 may take additional action. Any example of the additional action may be to approve or deny the real-time request based on the predicted probability of the classification. For example, based on the predicted likelihood that the real-time request belongs to the unapproved classification, the classification application 1435 may deny or prohibit the request. Based on the predicted likelihood that the real-time request belongs to the approved classification, the classification application 1435 may approve, allow, or complete the request. The classification application 1435 may take other or additional actions.

The classification application 1435 may be executed by the processor 1430. The instructions to execute the classification application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the classification system 1400 and operatively associated with the computer-readable medium 1410. The memory controller 1440 may be configured as a logical block or circuitry that receives instructions from the host device 1405 and performs operations in accordance with those instructions. For example, to execute the classification application 1435, the host device 1405 may send a request to the memory controller 1440. The memory controller 1440 may read the instructions associated with the classification application 1435. For example, the memory controller 1440 may read classification computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the classification system 1400 are shown and described in FIG. 14. However, the classification system 1400 may include other components such as various batteries and power sources, networking interfaces, routers, switches, external memory systems, controllers, etc. Generally speaking, the classification system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
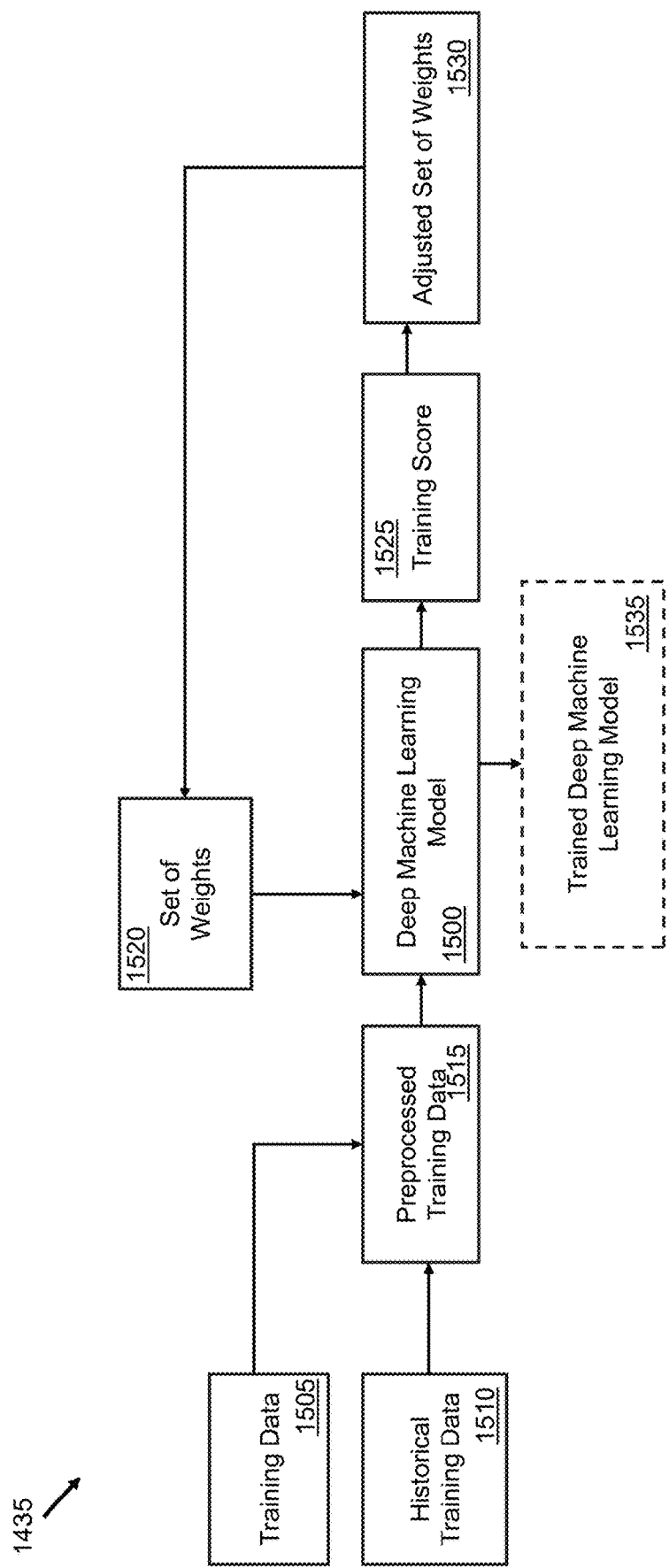
FIG. 15 illustrates a block diagram showing additional details of the classification system of FIG. 14 for training a deep machine learning model for predicting the classification of requests, according to embodiments of the present technology.

Turning to FIG. 15, an example block diagram shows greater detail of the classification application 1435, in accordance with some embodiments of the present disclosure. The block diagram of FIG. 15 shows the classification application 1435 in the context of a training phase of a machine learning model, and particularly of a deep machine learning model 1500, to predict a likelihood that a request belongs to one class of a binary classification. A "binary classification" means that the classification may have two outcomes. Predicting the likelihood that a request belongs to a particular binary classification means that the deep machine learning model may predict how likely is that the request falls under a first classification or a second classification, with the first and second classifications being the two outcomes of the classification. For example, in some embodiments, the classification may be "authorized" or "unauthorized" in which case a request may either be an authorized request or an unauthorized request. In other embodiments, other or additional binary classifications may be used. In general, the classification application 1435 of the present disclosure may be used in any application where a prediction of a likelihood of a binary classification is desired.

To train the deep machine learning model 1500, the classification application 1435 may receive training data 1505. The training data 1505 may be raw data associated with each of a plurality of training requests. In some embodiments, hundreds or thousands of training requests may be used to train the deep machine learning model 1500. The raw data associated with the training data 1505 may be request data associated with each of the plurality of training requests. For example, to predict the likelihood of black or white images, the raw data may be image data associated with a plurality of images. To predict the likelihood that patients have a heart condition or not, the raw data may be medical data associated with a plurality of patients. Thus, the type and format of the raw data may be dependent on the type of application in which the likelihood of the binary classification is to be predicted. It is to be understood that any example used herein is not intended to be construed as limiting. Rather, the examples are used for explanation purposes only.

The training data 1505 of each of the plurality of training requests may be represented as a set of training variables. Each training variable may be of a particular attribute type depending upon the application. For example, to predict unauthorized requests, the attribute types may be associated with user information (e.g., of the user making the request), entity or organization information (e.g., name, merchant category code, zip code, etc. of the entity or organization where the request is made), location information associated with a location of the user, location information associated with a location of the entity or organization, request related information such as date when the request is made, manner in which request is made, details of the device using which the request is made, any amounts associated with the request, the instrument used to make the request, and the like. The training data 1505 may include other or additional attribute types. Thus, the training data 1505 of each of the plurality of training requests may have a set of training variables and each training variable may be of a particular attribute type.

In some embodiments, when a request is made, a standard messaging protocol may be used to send information associated with the request. The sent information may include the set of training variables and may form the training data 1505. In some embodiments, the sent information may be in the form of a message. For example, in some embodiments, when a request is made, a message in the format of the international messaging standard ISO 8583 may be sent. The message may include multiple message segments, with each message segment conveying a particular type of information. For example, in some embodiments, the message may include a header message segment having network information, institution identification codes, etc. The message may also include a message type indicator message segment indicating a function or type of the overall message such as authorization request, network management request, administrative message, etc., origin of the message such as the acquirer or the issuer, etc., version of the ISO standard being used, etc. The message may also include one or more data element message segments that include request specific information such as the date of the request, any amount associated with the request, any instrument (e.g., credit card, debit card, gift card, etc.) information such as number, expiration date, etc., user information such as user name, address, location, etc., point of service entry mode (e.g., chip reader, etc.), entity information such as name, address/location, entity type (e.g., merchant category code), identity of the point of service entry mechanism, currency in which the request is made, user account number or associated token number, and other information associated with the request. The message may include other or additional information, as well as other or additional message segments.

The data in each of the message segments may be numeric, alphabetical, alphanumeric, binary, special characters, etc. The length of each message segment may vary as well depending on the ISO standard used, as well as the application. The ISO 8583 standard is only an example. In other embodiments, the teachings of the present disclosure may be applied to other messaging standards or even in situations when information is sent in other ways. Depending on the application, the training data 1505 associated with each training request may include dozens, or hundreds, or thousands of training variables. In some embodiments, the training request may be sent in the form of an Application Programming Interface (API) message or request. Thus, the set of training variables for each of the plurality of training requests may be referred to as the set of API training variables.

In addition to the training data 1505, historical training data 1510 may be used to train the deep machine learning model 1500. For each of the plurality of training requests for which the training data 1505 is received, a corresponding set of the historical training data 1510 may be determined as well. The historical training data 1510 may represent past activity. For example, if the training data 1505 includes data from ten thousand training requests, each of the ten thousand requests may have an associated historical profile represented by the corresponding historical training data 1510. The historical training data 1510 may be identified based on the associated training request. For example, in some embodiments, a specific attribute type in the training request may be used to identify the past data having the same specific attribute type. For example, in the context of a transaction related training request made using a particular instrument, the historical training data 1510 may include past transactions made with the same instrument. The historical training data 1510 of each training request may be represented by a set of historical training variables and each variable may have a particular attribute type such as those discussed above. The historical training data 1510 of a particular training request may constitute or provide a "signature" of the training request that may be used to train the deep machine learning model 1500. Thus, the historical training data 1510 of each training request may be represented by a set of signature training variables.

Thus, the training data 1505 may include a set of API training variables for each of a plurality of training requests and the historical data 1510 may include a set of signature training variables for each of the plurality of training requests.

The training data 1505 and the historical training data 1510 may be used to obtain preprocessed training data 1515. The preprocessed training data 1515 may include another set of training variables, which may be derived from the set of API training variables (e.g., the training data 1505). In particular, and as indicated above, the set of API training variables may include a plurality of attribute types. Not all attribute types may be relevant for the prediction. Thus, data corresponding to relevant attribute types may be extracted from the set of API training variables to form another set of training variables. This another set of training variables may be a subset of the set of API training variables. In some embodiments, the attribute types that are considered relevant may depend upon the application and/or the classification that is to be predicted. In some embodiments, the relevant attribute types may be predetermined. Certain types of data that may be irrelevant for the prediction may be filtered out, thereby reducing the number of attribute types from possibly hundreds or thousands to thirty or forty relevant attribute types. By reducing the number of attribute types, the amount of computation and storage space needed may be reduced, while accuracy of prediction may be increased. Thus, the preprocessed training data 1515 may include the another set of training variables which may be created from the set of API training variables.

The preprocessed training data 1515 may also include a set of training parameters that may be computed based on the training data 1505 and the historical training data 1510. For example, in some embodiments, a distance between locations of two consecutive training requests by a particular user may be computed. In particular, if the user made a first training request at location A and a second training request immediately following (or preceding) the first training request at location B, the distance between location A and location B may be computed as a training parameter. In some embodiments, a distance between the location of the user making the training request and the location of the entity or organization (e.g., merchant) where the training request is made may be computed. For example, if the user made the training request at a physical location (e.g., store) of the entity/organization, the distance between the location of the user and the entity/organization may be zero. On the other hand, if the user made the request remotely (e.g., via telephone, online, etc.) from location A, then the distance between the location A and the location B where the entity/organization to which the request is made is located may be computed as another training parameter. In some embodiments, the identity of the entity/organization at which the request is made may be determined as another training parameter. For example, if the training data 1505 or the historical training data 1510 includes a merchant category code, the brand name of the merchant where the request may have been made may be determined. In some embodiments, the brand name may be derived from the merchant category code and the name of the entity associated with the brand name. For example, if the name of the entity is SUNOCO and the merchant category code indicates a gas category, the brand name may be SUNOCO. In some embodiments, another training parameter may include a determination whether a training request is a probe request (e.g., to determine if a certain aspect associated with request is active or real or not). In some embodiments, the probe request may be identified based on an amount associated with the request. For example, if the amount is under a predefined threshold (e.g., less than $5), the request may be determined to be a probe request. In other embodiments, other parameters may be used to identify probe requests. In some embodiments, other or additional types of training parameters may be computed, stored, and used for training the deep machine learning model 1500.

The preprocessed training data 1515 may also include training sequence data. In some embodiments, a plurality of training sequences may be generated from the another set of training variables, the historical training data 1510, and the set of training parameters that are computed. Each of the plurality of training sequences may be of a particular attribute type. For example, one training sequence may include data selected from the another set of training variables, the historical training data 1510, and the set of training parameters associated with a request date; another sequence may include data selected from the another set of training variables, the historical training data, and the set of training parameters associated with the request time; yet another sequence may include data selected from the another set of training variables, the historical training data, and the set of training parameters associated with the entity or organization code (e.g., the merchant category code), and so on. Thus, for each of the plurality of training requests, a plurality of training sequences may be generated to form the preprocessed training data 1515, with each training sequence including data values of a particular attribute type.

Further, each training sequence may be either a numeric sequence or a categorical sequence. A sequence may be considered numeric if all the data in that sequence is numerical data (e.g., numbers). A sequence may be considered categorical if any data in the sequence is non-numerical (e.g., alphabetical, alphanumerical, binary, special characters, etc.). Thus, a categorical sequence may have numeric and non-numeric data or only non-numeric data. A categorical sequence is also referred to herein as a "string" sequence. The string sequences may be converted or encoded into numeric sequences before inputting into the deep machine learning model 1500. The converted or encoded string sequences may be referred to as encoded string sequences.

Thus, each of the plurality of training requests may have associated therewith a plurality of numeric training sequences and a plurality of string training sequences, which may be input into the deep machine learning model 1500 along with a set of weights 1520 to train the deep machine learning model. The set of weights 1520 may include weights for each of the plurality of numeric training sequences and weights for each of the plurality of encoded string training sequences. The deep machine learning model 1500 may be trained in a plurality of iterations. Each iteration of the training process may generate a training score 1525 for each of the plurality of training requests. The training score 1525 may be indicative of the likelihood that a particular training request of the plurality of training requests belongs to a particular classification. In some embodiments, the training score 1525 may be an integer number. In some embodiments, the training score may be a number between 1 and 999. In other embodiments, other or additional ranges of the training score 1525 may be used. In some embodiments, higher the training score 1525, the higher the likelihood that a particular training request belongs to a specific classification. For example, if the classification is to predict the likelihood of an unauthorized request, higher the training score 1525, the higher the likelihood that the request is an unauthorized request.

Thus, each iteration of the training process may generate a plurality of training scores (e.g., the training score 1525). Each training score may be compared with an expected score during the training phase. The expected score may indicate whether a particular training request actually belongs to a particular categorization or not. For example, if the training score 1525 has a value of ten indicating that a particular request is likely an authorized request and the expected score is 900 indicating that the particular request is likely an unauthorized request, then the deep machine learning model 1500 may have made an incorrect prediction and needs to be trained more. To continue training the deep machine learning model 1525, the set of weights 1520 may be adjusted to obtain an adjusted set of weights 1530, which may then be used instead of the set of weights 1520 to continue training the deep machine learning model 1500 in future iterations. The training of the deep machine learning model 1500 may continue until the training score 1525 is within a particular value threshold of the expected score (e.g., the training score and the expected score are same or close enough). Upon training the deep machine learning model 1500, a trained deep machine learning model 1535 may be obtained that may be used to make predictions for real-time requests.

Figure 16:
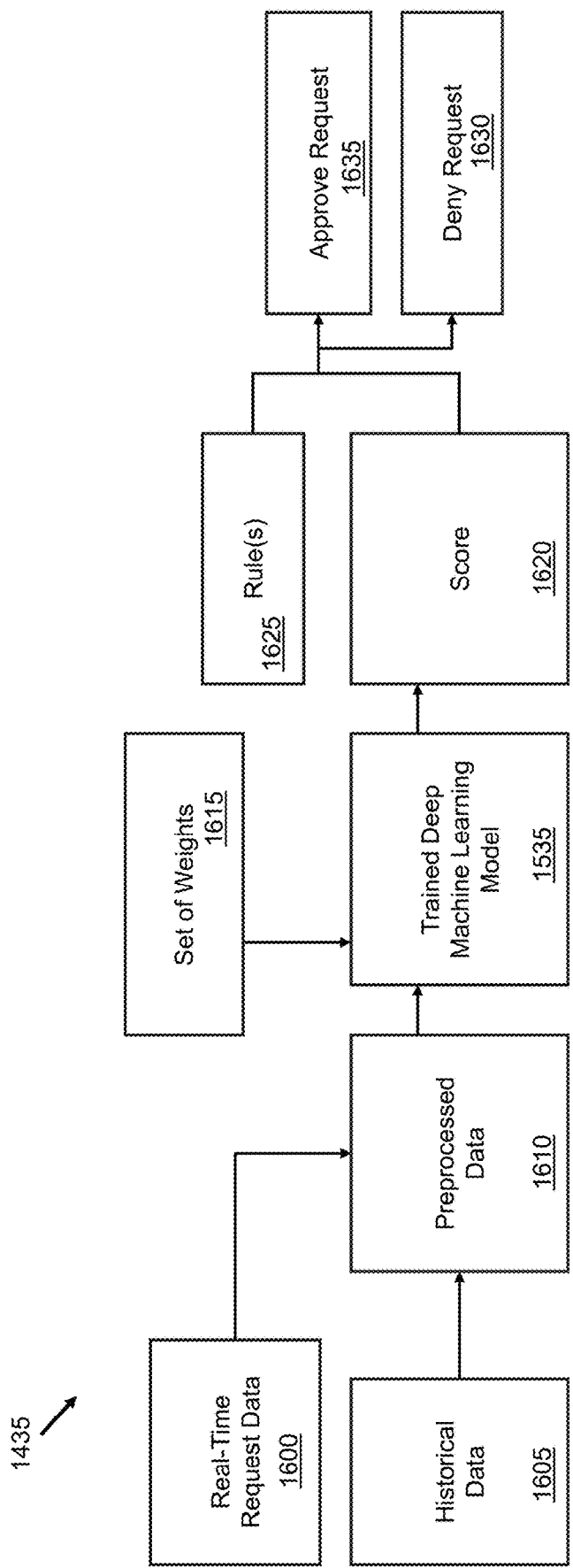
FIG. 16 illustrates a block diagram showing additional details of the classification system of FIG. 14 for using the trained deep machine learning model of FIG. 15 for predicting the classification of requests, according to embodiments of the present technology.

Referring now to FIG. 16, an example block diagram of the classification application 1435 in the context of a production phase is shown, in accordance with some embodiments of the present disclosure. The block diagram of FIG. 16 uses the trained deep machine learning model 1535 to predict the likelihood that a particular real-time request belongs to a particular classification (e.g., unauthorized) of a binary classification (e.g., authorized or unauthorized). In some embodiments, the classification application 1435 may be configured to predict the likelihood that the real-time request belongs to a particular classification in real-time or substantially real-time, for example, within a few milliseconds (e.g., twenty milliseconds or less) of receiving the real-time request. In some embodiments, after predicting the likelihood that the real-time request belongs to a particular classification, the classification application 1435 may also be able to, in real-time or substantially real-time (e.g., within a few milliseconds), take action on the real-time request. The action may be to approve/complete the request or deny the request.

The real-time request may be associated with real-time request data 1600. The real-time request data 1600 may be generated responsive to receiving the real-time request via an input device (e.g., the input devices 1415). For example, when an instrument is used on a point-of-service device, the real-time request data 1600 may be generated. The real-time request data 1600 be in the form of a message having a plurality of message segments, as discussed above with respect to training requests. The real-time request data 1600 may be represented by a first set of variables (e.g., API variables). Each variable in the first set of variables may be of a particular attribute type similar to that discussed above in FIG. 15.

The real-time request may also be associated with historical data 1605. For example, in some embodiments, in the context of a transaction, the historical data 1605 may be past transactions made with the instrument used for the real-time request. In some embodiments, the classification application 1435 may identify the historical data 1605 based on the real-time request data 1600. For example, in some embodiments, an instrument or account number may be used to identify the past requests made by that instrument or account number. In some embodiments, other types of attribute types in the real-time request data 1600 may be used to identify the associated historical data 1605. How many time steps in the past to go to may be predefined within the classification application 1435. For example, the classification application 1435 may be pre-programmed to identify the past ten transactions or identify transactions within a particular time frame (e.g., last twelve hours). Other or additional criteria may be used to identify the time steps to identify the historical data 1605.

The real-time request data 1600 and the historical data 1605 may be used to compute preprocessed data 1610. The preprocessed data 1610, similar to the preprocessed training data 1515, may include a relevant subset of the real-time request data 1600 (e.g., a second set of variables), a set of parameters computed based on the real-time request data and the historical data, and sequence data having a plurality of numeric sequences and a plurality of string sequences. The preprocessed data 1610 may also convert each of the plurality of string sequences into an encoded string sequence. The plurality of numeric sequences and the plurality of encoded string sequences may be input into the trained deep machine learning model 1535, along with a set of weights 1615 to generate a score 1620. The set of weights 1615 may be the same weights (e.g., the set of weights 1520) used in the last iteration of training the deep machine learning model 1500. The score 1620 is similar to the training score 1525. The score 1620 may indicate a likelihood that the real-time request belongs to a particular classification. For example, a lower value of the score 1620 may indicate that the real-time request is likely an authorized request, while a higher value of the score may indicate that the real-time request is likely an unauthorized request. Higher the score 1620, higher the likelihood that the real-time request is unauthorized.

The score 1620 may be combined with one or more rules 1625 applied to the real-time request to confirm the classification of the real-time request and take action on the real-time request. The one or more rules 1625 may include any of a variety of user defined or system generated rules. For example, a rule may be based on whether a particular user or instrument has made unauthorized requests in the past. Other rules may be based on whether a request was made in a certain manner (e.g., using a chip reader, using an instrument on file, etc.), using a certain modality (e.g., gift card, etc.), in a certain location (e.g., made in a brick-and-mortar location or online), at a certain entity or organization, etc. The one or more rules 1625 may be used to further verify or justify or improve the prediction made by the trained deep machine learning model 1535. For example, if the score 1620 indicates a high likelihood that the real-time request belongs to an unauthorized classification and the one or more rules 1625 also indicate that the real-time request is likely unauthorized, the classification application 1435 may conclude the real-time request is unauthorized and deny the real-time request, as indicated in box 1630. On the other hand, if the score 1620 and the one or more rules 1625 both indicate a higher likelihood that the real-time request is a legitimate request (e.g., belongs to the approved classification), the classification application 1435 may approve the request, as indicated in box 1635. If the score 1620 and the one or more rules 1625 come to different conclusions (e.g., one predicts that the real-time request is likely unauthorized and another indicates a likelihood that the real-time request is authorized), then the classification application 1435 may be configured to apply additional criteria to determine whether the real-time request is unauthorized or authorized and/or give higher weight to one of the score or the rules.

Figure 17:
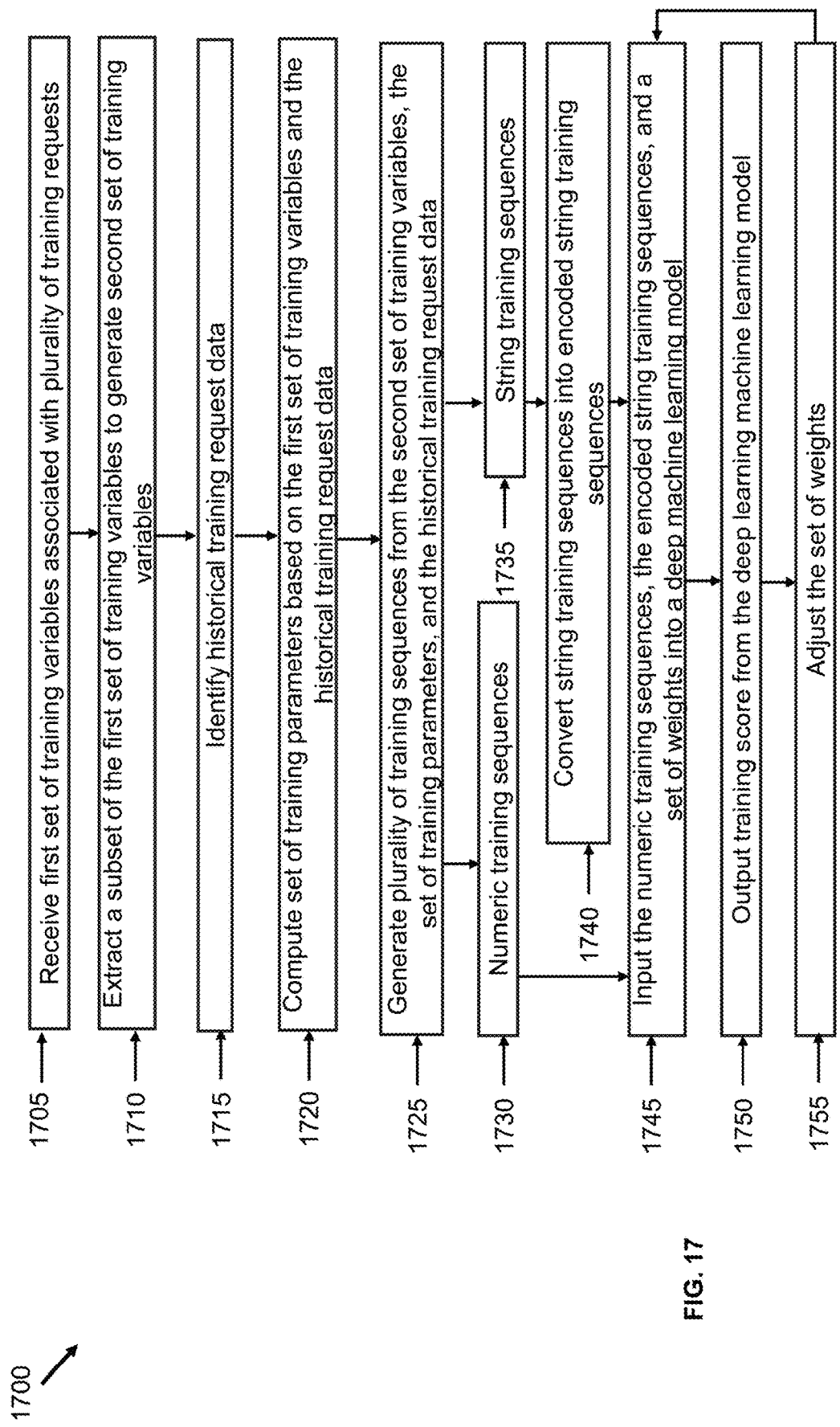
FIG. 17 illustrates an example flow chart outlining operations of a process for training the deep machine learning model of FIG. 15, according to embodiments of the present technology.

Referring to FIG. 17, an example flow chart outlining operations of a process 1700 is shown, in accordance with some embodiments of the present disclosure. The process 1700 may be used to train a deep machine learning model (e.g., the deep machine learning model 1500). Thus, the process 1700 may be considered analogous to FIG. 15. The process 1700 may include other or additional operations depending upon the particular embodiment. The process 1700 may be executed by one or more processors (e.g., the processor 1430). In particular, the one or more processors may execute the classification computer-readable instructions 1445 to train the deep machine learning model 1500.

At operation 1705, the one or more processors receive a first set of training variables associated with each of a plurality of training requests. The first set of training variables form the training data 1505. At operation 1710, the one or more processors extract a predetermined subset of the first set of training variables to generate a second set of training variables for the each of the plurality of training requests, as described above with respect to the preprocessed training data 1515. The predetermined subset may include data associated with attribute types considered relevant for the prediction. At operation 1715, the one or more processors identify, for the each of the plurality of training requests, associated historical training request data (e.g., the historical training data 1510). Data associated with past training requests may be gathered and stored in a database. In some embodiments, each row of the database may be associated with one historical training request. In some embodiments, each column of the database may be associated with one attribute type. Thus, in some embodiments, the database may include a plurality of rows and a plurality of columns. The historical training request data may be identified from this database, for example, by identifying the relevant rows from the database.

In some embodiments, the historical training request data associated with specific attribute types may be identified. For example, in some embodiments, the historical training request data for the attribute types that are in the second set of training variables may be identified. In other words, for a particular historical training request, only certain columns of the data from the database may be identified. In some embodiments, the number of rows (or in other words, the number of historical requests) that are identified at the operation 1710 may be predetermined and preprogrammed. For example, in some embodiments, for each training request, historical (N−1) requests may be identified, where N may be a predetermined number (e.g., 10). In some embodiments, for each request, historical training request data going back to a certain time frame (e.g., past 12 hours) may be identified from the database.

At operation 1720, the one or more processors compute a set of training parameters based on the first set of training variables and the historical training request data for each of the plurality of training requests. As discussed above, the set of training parameters may include a distance between locations associated with two consecutive training requests and/or distance between a location of a user associated with a training request and a location where the training request was made. In some embodiments, the set of training parameters may additionally or alternatively include a brand name of the entity/organization where the request was made, a determination (e.g., a flag) whether a training request is a probe or not, etc.

At operation 1725, the one or more processors generate a plurality of training sequences for the each of the plurality of training requests. The plurality of training sequences for a training request of the plurality of training requests include a plurality of numeric training sequences as shown at operation 1730 and a plurality of string training sequences as shown at operation 1735. Each of the plurality of numeric training sequences of the operation 1730 and each of the plurality of string training sequences of the operation 1735 include a plurality of training values of a specific training attribute type. The plurality of training values are selected from the second set of training variables of the operation 1710, the set of training parameters of the operation 1720, and the historical training request data of the operation 1715. An example of a sequence is shown in FIG. 20.

Figure 20:
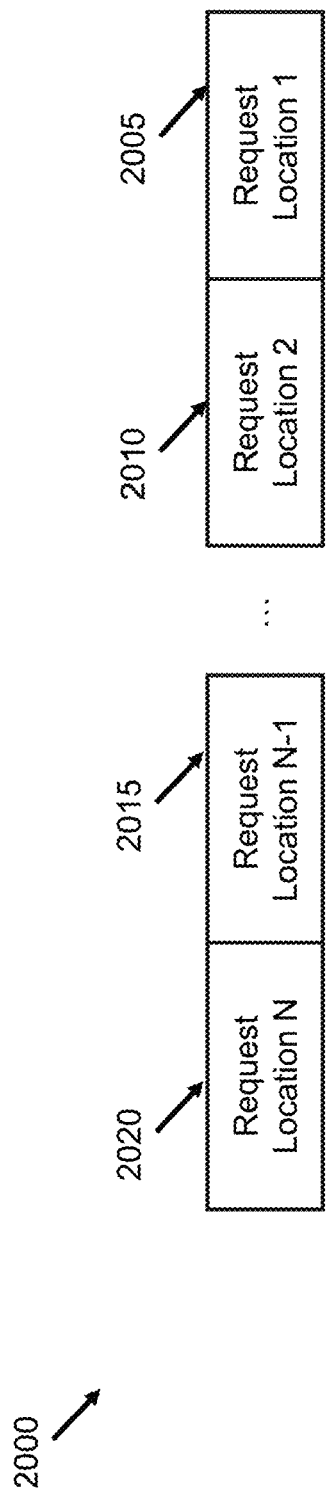
FIG. 20 illustrates an example of sequence data to be used in the processes of FIGS. 17 and 19, according to embodiments of the present technology.

Referring to FIG. 20 in conjunction with FIG. 17, an example sequence 2000 is generated based on the second set of training variables, the set of training parameters, and the historical training request data. The sequence 2000 is shown for the attribute type location (e.g., location where the request is made). In some embodiments, location data may be identified based on zip code in which case the sequence 2000 may be a numeric sequence. In some embodiments, the location may be identified based on an address or coordinates in which case the sequence 2000 may be a string sequence. Regardless of whether the sequence 2000 is numeric or string, the sequence includes only data for the attribute type location. The sequence 2000 includes data concatenated from N training requests. For example, the sequence 2000 includes location data one for time step one 2005 from the training request associated with the first set of variables determined at the operation 1705 and location data from (N−1) historical training requests determined at the operation 1715. For example, the historical location data may include location data two for time step two 2010, location data N−1 for time step N−1 2015, and location data N for time step N 2020. Sequences similar to the sequence 2000 may be created for each attribute type in the second set of training variables for each training request and the set of training parameters for each training request. Although concatenation is used to create the sequence 2000, in other embodiments, other functions may be used to create the sequence data.

Returning to FIG. 17, at operation 1740, the one or more processors convert each of the plurality of string training sequences of the operation 1735 into an encoded string training sequence to obtain a plurality of encoded string training sequences. In some embodiments, the deep learning machine model 1500 may accept numeric inputs only. By encoding a string training sequence, that string sequence may be converted into a numeric sequence suitable for training the deep learning machine model 1500. In some embodiments, a string sequence may be encoded using either one-hot encoding or random function generation.

In some embodiments, the one or more processors may determine a number of distinct values of a specific attribute type in the plurality of string sequences of the operation 1735. For example, if the location in the sequence 2000 is determined based on zip code, the one or more processors may determine the number of distinct or unique addresses in that sequence. Responsive to determining that the number of the distinct values is less than or equal to a value threshold, the one or more processors may assign a different numeric value vector to each of the distinct values of the specific attribute type based on one-hot encoding. The size of each numeric value vector may be equal to the number of the distinct values. For example, if the one or more processors determine that the sequence 2000 includes five different addresses, then the one or more processors may assign a different numeric value vector to each address and the size of each value vector may be five. The numeric values may be a combination of zeroes and one. In each numeric value vector, one of the distinct values may be assigned the number one while other distinct values may be assigned the number zero. This way, each of the distinct values may be represented by a unique or different numeric value vector. Examples of how numeric value vectors may be assigned using one-hot encoding in the location example above are shown in Table 1 below:

TABLE 1

| Location | Numeric Value 1 | Numeric Value 2 | Numeric Value 3 | Numeric Value 4 | Numeric Value 5 |
|---|---|---|---|---|---|
| Address 1 | 1 | 0 | 0 | 0 | 0 |
| Address 2 | 0 | 1 | 0 | 0 | 0 |
| Address 3 | 0 | 0 | 1 | 0 | 0 |
| Address 4 | 0 | 0 | 0 | 1 | 0 |
| Address 5 | 0 | 0 | 0 | 0 | 1 |

Thus, as shown in Table 1 above, the address 1 is mapped to the numeric value vector 10000, the address 2 is mapped to the numeric value vector 01000, the address 3 is mapped to the numeric value vector 00100, and so on. Thus, each address in the sequence 2000 is accorded a unique numeric value vector. Each address in the sequence 2000 may be replaced by the generated numeric value vectors for that address. For example, each time the address 1 appears in the sequence 2000, that address may be replaced by the numeric value vector 10000 in the sequence.

While one-hot encoding is a suitable mechanism to encode string sequences having a small number of distinct values, one-hot encoding may not be feasible when the number of distinct values is large because the dimension of the numeric value vector may become too large. Instead, when the number of distinct values is large, the one or more processors may encode the string sequences by mapping those string sequences to numeric random dense vectors of a fixed size. Unlike the one-hot encoding mechanism in which the numeric values in the numeric value vectors are binary, the entries in the mapped numeric random dense vectors may be floating numbers. In some embodiments, the values of these floating numbers may be trained by specifying a trainable embedding layer in a deep learning framework like TensorFlow. In other embodiments, each string sequence may be mapped to a random dense vector of size M centered around zero. In some embodiments, M may be predetermined. In some embodiments, M may be determined based on the following formula:

$$M = \text{square root (#distinct values in the string sequence)} + 1 \quad \text{Equation 1}$$

For example, if the number of distinct values in a string sequence is one hundred, then M may be computed as a square root of one hundred plus one, which is equal to eleven. Thus, each distinct value in the string sequence may be mapped to a dense vector of size eleven. In some embodiments, the one or more processors may generate each random dense vector (also referred to herein as an embedding) using a random number function generator. In other embodiments, the one or more processors may use another mechanism to generate the random dense vectors. An example of a dense vector is shown in FIG. 21.

Figure 21:
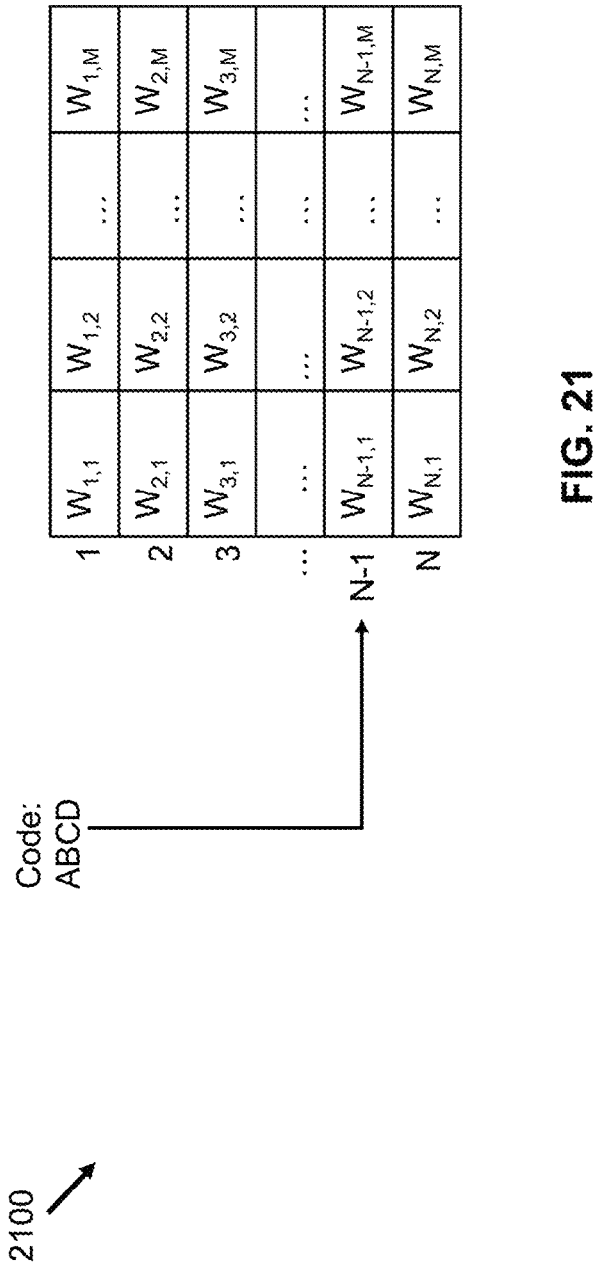
FIG. 21 illustrates an example of encoding string sequences to be used in the processes of FIGS. 17 and 19, according to embodiments of the present technology.

Referring to FIG. 21 in conjunction with FIG. 17, an example of a mapping 2100 of random dense vectors is shown. The mapping 2100 may include N rows and M columns. Each of the N rows corresponds to a particular distinct value. So, if the sequence 2000 includes one hundred distinct values, N may be one hundred and the mapping 2100 may include one hundred rows, with one row for each distinct value. The number of columns in the mapping corresponds to the computed value of M above. For example, if the number of distinct values is one hundred, then using Equation 1, M is computed to be eleven. Thus, the mapping 2100 may include eleven columns, with each column having a vector value that corresponds to a random dense vector. An example of random vectors having a size four is shown in Table 2 below:

TABLE 2

| Distinct Value | d1 | d2 | d3 | d4 |
|---|---|---|---|---|
| z3 | 0.35339 | −0.43282 | 0.45702 | −0.20281 |
| pb | −0.22739 | 0.18993 | 0.47676 | −0.27349 |
| ... | ... | ... | ... | ... |
| b5 | 0.08258 | −0.12299 | 0.22836 | 0.00660 |
| q4 | 0.43121 | 0.42912 | 0.08966 | −0.20278 |

It is to be understood that the random values in Table 2 are only examples and not intended to be limiting in any way. Table 2 also does not show the weight values that may be assigned to each of the random values.

By assigning a random dense vector to each distinct value, each string sequence may be represented by a unique vector in a fixed dimension space. Each value in each dense vector may be adjusted by a corresponding assigned weight value. For example, in the mapping 2100, the vector value at row one, column one may be assigned a weight value $W_{1,1}$, the vector value at row two, column two may be assigned a weight value $W_{2,1}$, and so on. Although not shown in the mapping 2100, each weight value may have an associated randomly generated value as well (e.g., similar to Table 2). Each weight value in the mapping 2100 may be combined (e.g., multiplied) with the random value in the deep machine learning model 1500. The weight values may be adjusted in the deep machine learning model 1500. Thus, each dense vector may include a plurality of randomly generated values and corresponding plurality of weight values.

Each distinct value in a string sequence (e.g., the sequence 2000) may be replaced based on the mapping 2100. For example, if the sequence 2000 includes values associated with the attribute type "code" (e.g., institution codes), then using the mapping 2100, the dense vectors for each distinct value of code may be determined. For example, a code "ABCD" may correspond to a row "N−1." The random values and the weight values in the columns for the row "N−1" may form the dense vector for the code "ABCD." In other words, the dense vector for the code "ABCD" may be:

[$VW_{N-1,1}$ $VW_{N-1,2}$ .... $VW_{N-1,M}$]

$VW_{i,j}$ represents the random value and the weight value for the code "ABCD." In some embodiments, the dense vector for each distinct value may include two dense vectors: one dense vector for the random values and another dense vector for the corresponding weight values.

Each time the code "ABCD" is encountered in the sequence 2000, that code may be replaced by the dense vector above. For example, if in the sequence 2000, the code "ABCD" appears in the time step one 2005 and the time step N 2020, the code in those time steps may be replaced by the above dense vector. Thus, in some embodiments, the same random dense vector is assigned to a particular distinct value each time the distinct value is encountered in a particular one of the plurality of string sequences.

In sum, in some embodiments, the one or more processors may determine a number of distinct values of the specific attribute type in the plurality of string sequences and responsive to determining that the number of the distinct values is greater than a value threshold, generate a unique random dense vector for each of the distinct values of the specific attribute type. The one or more processors may determine the size of each of the random dense vector based on a square root of the number of the distinct values of the specific attribute type plus one.

Returning to FIG. 17, at the operation 1740, each of the plurality of string training sequences are converted into a corresponding numeric training sequence to obtain a plurality of encoded string training sequences. The plurality of numeric training sequences of the operation 1730 for each of the plurality of training requests and the plurality of encoded string training sequences of the operation 1740 for each of the plurality of training requests are input into the deep machine learning model 1500 at operation 1745. In addition, at the operation 1745, a set of weights (e.g., the set of weights 1520) are input into the deep machine learning model 1500. An example configuration of the deep machine learning model 1500 is discussed with respect to FIG. 18. The one or more processors train the deep machine learning model 1500 based on the plurality of numeric training sequences from the operation 1730, the plurality of encoded string training sequences from the operation 1740, and the set of weights (e.g., the set of weights 1520) to compute a training score (e.g., the training score 1525) from the deep machine learning model 1500 for each of the plurality of training requests of the operation 1705 at operation 1750. The training score may be indicative of a likelihood that each of the plurality of training requests of the operation 1705 belongs to the unauthorized classification.

In some embodiments, the set of weights may include one or more input matrices. For example, in some embodiments, the set of weights may include one weight matrix for the each of the vectors associated with the plurality of numeric training sequences and one weight matrix for each of the dense vectors associated with the plurality of encoded string training sequences. In some embodiments, the initial weight values (e.g., the weight values in the first iteration of training) may be randomly assigned or predefined default values may be used. The training process may use back-propagation to refine the accuracy of the training score 1525. For example, in some embodiments, the training score 1525 in each training iteration may be compared with an expected training score to compute a loss function. The loss function may measure how far the prediction (e.g., the training score 1525) from the deep machine learning model 1500 is from a true label (e.g., the expected training score). The loss function may be used to adjust the values of the set of weights. For example, in some embodiments, based on the loss function, a sub-gradient may be determined to indicate whether to increase or decrease a particular weight value. Based on the loss function, a step size or bias may also be determined to indicate a step size or by how much to increase or decrease a particular weight value. Based on the sub-gradient and the bias, the weight values of the set of weights may be adjusted at operation 1755 and the adjusted set of weights may be input back into the deep machine learning model 1500 to continue training the deep machine learning model.

In each iteration, the training score 1525 may be compared with the expected score, the loss function computed, and the set of weights adjusted until the training score 1525 converges with the expected score. In some embodiments, convergence may be achieved when a predetermined percentage of the training scores (e.g., the training score 1525) in each iteration are same as the expected score. In some embodiments, convergence may be achieved when a predetermined percentage of the training scores (e.g., the training score 1525) in each iteration are within a particular value threshold of the expected score. Upon achieving convergence, the deep machine learning model 1500 may said to be trained. In some embodiments, the deep machine learning model 1500 may continue to be periodically trained.

The trained deep machine learning model (e.g., the trained deep machine learning model 1535) may be stored as a file within the SAS® Analytic Store or ASTORE system. The ASTORE file may allow the state of the trained deep machine learning model 1535 to be saved in a transportable form. The ASTORE file may allow the trained deep machine learning model 1535 to be subsequently used to generate scores for new data. The ASTORE file may be considered an efficient representation of the trained deep machine learning model 1535 in binary format. In some embodiments, the ASTORE file may allow the various API training variables, the signature training variables, the sequence data, and other inputs into the trained deep machine learning model 1535 to be packaged into a compiled security macro. In some embodiments, when the trained deep machine learning model 1535 is intended to be used in production, in some embodiments, the ASTORE file may be published to a micro analytic service (e.g., the SAS® Micro Analytic Service). Upon publication, the state of the trained deep machine learning model 1535 may be restored and available to generate new scores during production phase. Storing the trained deep machine learning model 1535 as an ASTORE file allows efficient and fast execution, with the ability to generate a score under tens of milliseconds upon publication.

Figure 18:
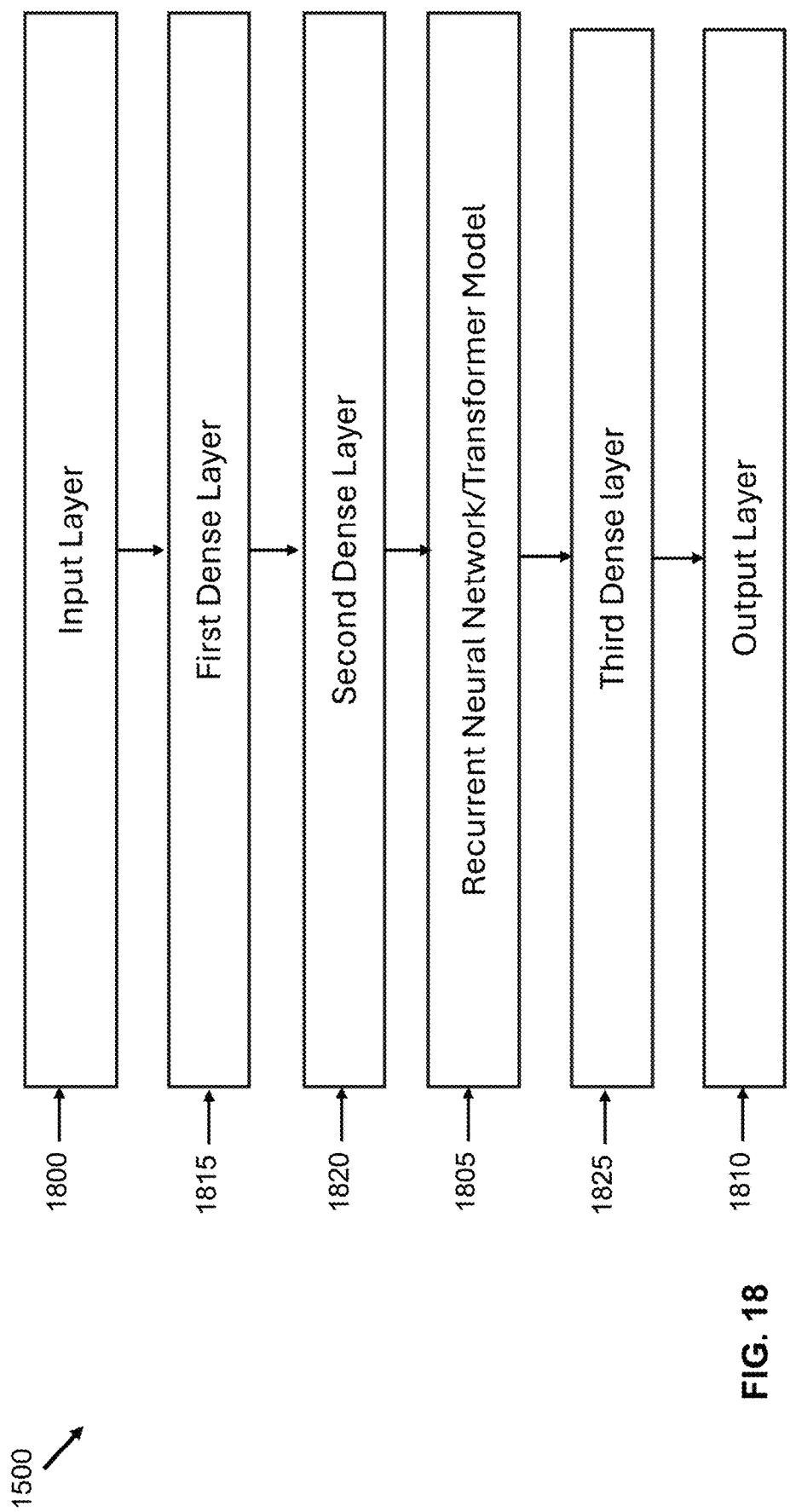
FIG. 18 illustrates an example architecture of the deep machine learning model of FIG. 15, according to embodiments of the present technology.

Turning now to FIG. 18 and referring to FIG. 18 in conjunction with at least FIG. 12, an example block diagram shows the architecture of the deep machine learning model 1500, in accordance with some embodiments of the present disclosure. The deep machine learning model 1500 may be a neural network having a plurality of layers, including for example, an input layer 1800 to receive the plurality of numeric sequences, the plurality of encoded string sequences, and the set of weights, at least one Recurrent Neural Network (RNN) layer or at least one transformer model layer 1805, and an output layer 1810 to output the score. The deep machine learning model 1500 may also optionally include at least one dense layer between the input layer 1800 and the at least one RNN layer or at least one transformer model layer 1805. For example, in some embodiments, the deep machine learning model 1500 may include two dense layers such as a first dense layer 1815 and a second dense layer 1820 between the input layer 1800 and the at least one RNN layer or at least one transformer model layer 1805. In some embodiments, the deep machine learning model 1500 may include a single dense layer or more than two dense layers between the input layer 1800 and the at least one RNN layer or at least one transformer model layer 1805. Further, in some embodiments, the deep machine learning model 1500 may optionally include at least one additional dense layer between the at least one RNN layer or at least one transformer model layer 1805 and the output layer 1810. For example, in some embodiments, the deep machine learning model 1500 may include a third dense layer 1825 between the at least one RNN layer or at least one transformer model layer 1805 and the output layer 1810.

In some embodiments, inclusion of the dense layers between the input layer 1800 and the at least one RNN layer or at least one transformer model layer 1805 may improve performance more than including additional RNN or transformer model layers. In some embodiments, adding dense layers may have less computational cost than adding additional RNN or transformer model layers. Each of the layers (e.g., the input layer 1800, the output layer 1810, the at least one RNN layer or at least one transformer model layer 1805, and the various dense layers such as the first dense layer 1815, the second dense layer 1820, and the third dense layer 1825) may include a plurality of neurons, similar to the neural network 1200. In some embodiments, the first dense layer 1815 may include one hundred and twenty-eight neurons, the second dense layer 1820 may include sixty-four neurons, and each of the at least one RNN layer or at least one transformer model layer 1805 may include thirty two RNN units or thirty two transformer units, respectively. In some embodiments, the third dense layer 1825 may include eight neurons. The number of neurons in each of the layers above is only an example. In other embodiments, one or more of the layers may have a different number of neurons than indicated. In some embodiments, each neuron may perform operations discussed above in FIG. 12.

When the at least one RNN layer or at least one transformer model layer 1805 includes RNN, the RNN may be considered a bi-directional neural network having an internal memory or hidden state such that an output from a previous iteration or step is input back into a current iteration or step. The RNN may include a plurality of hidden layers, each of which may include one or more feedback loops. The feedback loops may provide the RNN with a "memory" such that a current output is based on the current input as well as one or more previous or historical outputs. The feedback loops may allow the RNN to recurrently process sequential data over a plurality of time steps. Therefore, RNN is suitable for processing sequential data and particularly time-series data. When RNN is used in the at least one RNN layer or at least one transformer model layer 1805, the RNN may be a one-to-one type RNN (e.g., has one input and one output), one-to-many type RNN (e.g., has one input and multiple outputs), many-to-one type RNN (e.g., has multiple inputs and one output), or many-to-many type RNN (e.g., has multiple inputs and multiple outputs).

RNN may include a plurality of RNN units (e.g., thirty two units). In some embodiments, each of the plurality of RNN units may be a Long Short-term Memory (LSTM) unit. In other embodiments, each of the plurality of RNN units may be a Gated Recurrent Unit (GRU). In some embodiments, GRU may be less computationally intensive than :STM, and therefore GRU may be preferable.

LSTM is able to analyze sequential data and control the flow of information by selectively retaining or discarding information as needed. Each LSTM unit or cell may include a plurality of memory cells connected in a sequential chain. Each of the plurality of memory cells may receive an input and generate an output. Each of the plurality of memory cells may include one or more gates. For example, each of the plurality of memory cells may include an input gate to selectively control the input into the memory cell (e.g., whether to let a new input in or not), an output gate to selectively control the output from the memory cell, and a forget gate to determine whether the memory cell remembers information from previous time steps in a current time step (e.g., remember the previous state of the memory cell or forget the previous state of the memory cell). Thus, the gates allow selectively allowing or retaining information from previous time steps, allowing the LSTM to maintain long-term dependencies in the input data.

In some embodiments, each of the gates may be in the form of a sigmoid, ranging from zero to one. The sigmoid function may be an activation function that determines what information is passed through a particular gate. Based on the value between zero and one, the sigmoid function may either let the information pass through the gate or prevent the information from passing through the gate. A sigmoid function may be mathematically represented as:

$$\text{Sigmoid}(x)=1/(1+\exp(-x)) \quad \quad \text{Equation 2}$$

Each of the plurality of memory cells may also include a Tanh activation function to represent whether to pass the output from the memory cell on to other memory cells or back to the same memory cell in the next time step. In some embodiments, the Tanh function output may range between a negative one value and a positive one value. The Tanh activation function may be mathematically represented as:

$$\text{Tanh}(x)=[\exp(x)-\exp(-x)]/[\exp(x)+\exp(-x)] \quad \quad \text{Equation 3}$$

In other embodiments, each of the plurality of memory cells may include other or additional activation functions such as ReLU (rectified Linear Unit) to map the non-linearity. In some embodiments, the output from one memory cell of LSTM may be passed on to the next memory cell of the LSTM. In some embodiments, the input from the current time step may be combined (e.g., through multiplication, summation, etc.) with the output from the previous time steps to generate a vector. The Tanh function may be applied to vector to obtain a new memory or hidden state for the next time step, as well as for passing to the next memory cell. Additional details of LSTM may be found in Staudemeyer, Ralf C., Morris, Eric Rothstein, *Understanding LSTM—a tutorial into Long Short-Term Memory Recurrent Neural Networks*, September 2019, the entirety of which is incorporated by reference herein.

A GRU unit, similar to LSTM unit, includes a plurality of memory cells connected in a sequence or chain. In contrast to the LSTM that has three gates, GRU has two gates—an update gate and a reset gate. The update gate may be similar to LSTM's forget gate and the input gate, deciding what information to retain and what information to discard. The reset gate may determine how much of the past information to forget. Additional details of GRU may be found in R. Dey and F. M. Salem, "Gate variants of gated recurrent unit (GRU) neural networks", *Proc. IEEE 60th Int. Midwest*

*Symp. Circuits Syst. (MWSCAS)*, pp. 1597-160 August 2017, the entirety of which is incorporated by reference herein.

In some embodiments, the at least one RNN layer or at least one transformer model layer 1805 may include a transformer model layer. The transformer model layer may be considered a neural network that learns context through sequential data analysis. In some embodiments, the transformer model layer may be based on an encoder-decoder architecture having a plurality of encoder layers and a plurality of decoder layers. Each of the encoder layers may include two one or more sub-layers that implement an activation function such as ReLU or another activation function. Each layer may have its own weight values and bias parameters. Each of the decoder layers may also include one or more sub-layers. Additional details of a transformer model layer may be found in Vaswani Ashish, Shazeer Noam, Parmar Niki, Uszkoreit Jakob, Jones Llion, Gomez Aidan N., Kaiser Łukasz, and Polosukhin Illia, "Attention is all you need", *Advances in Neural Information Processing Systems*, pp 5,998-6008. December 2017, the entirety of which is incorporated by reference herein.

Figure 19:
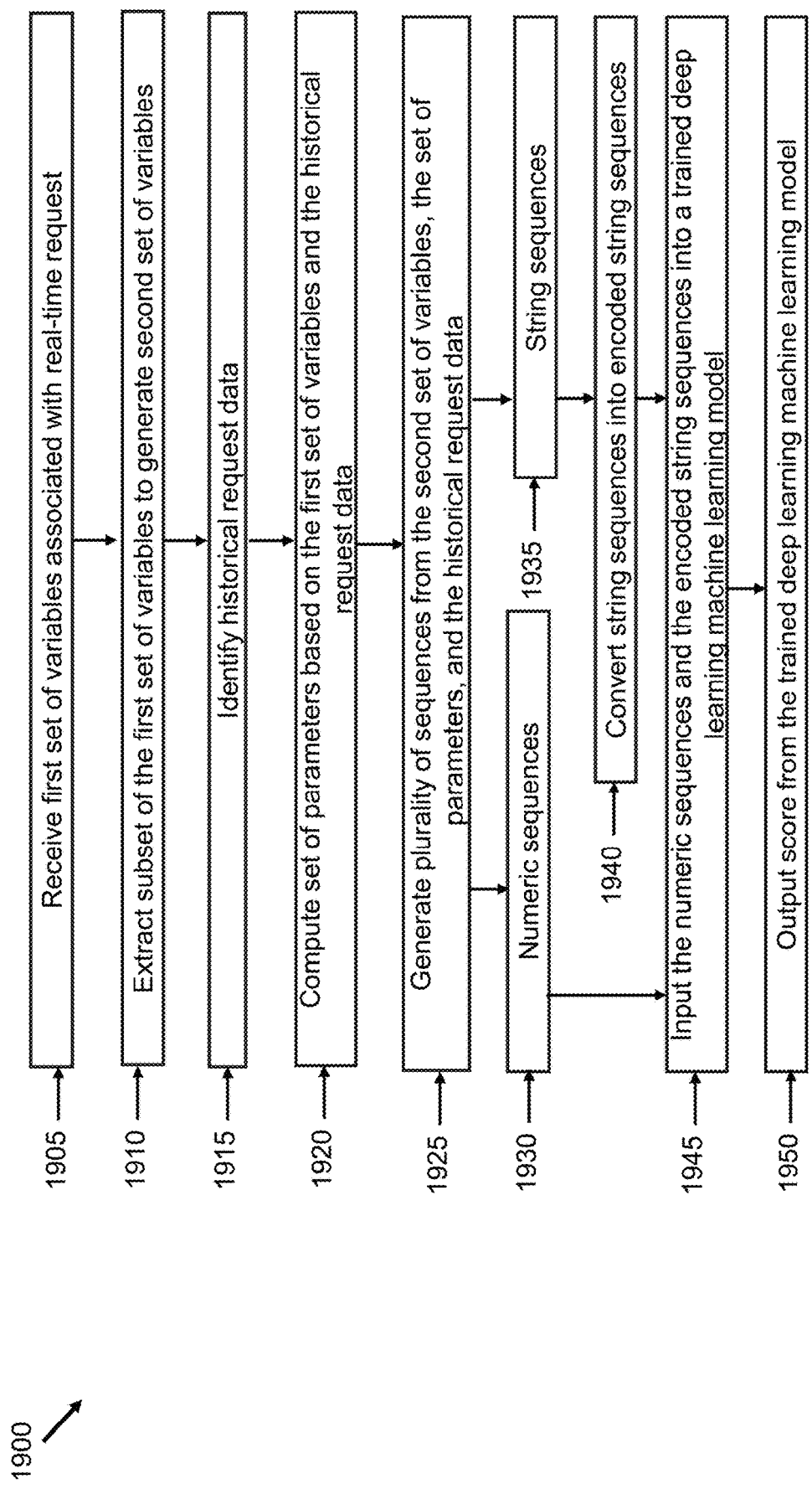
FIG. 19 illustrates an example flowchart outlining operations of a process for using the classification system of FIG. 14 for predicting the classification of requests, according to embodiments of the present technology.

Referring now to FIG. 19, an example flow chart outlining operations of a process 1900 is shown, in accordance with some embodiments of the present disclosure. The process 1900 may be used to predict the likelihood that a particular real-time request belongs to a specific classification (e.g., the unauthorized classification). Thus, the process 1900 may be considered analogous to FIG. 16. The process 1900 may include other or additional operations depending upon the particular embodiment. The process 1900 may be executed by one or more processors (e.g., the processor 1430). In particular, the one or more processors may execute the classification computer-readable instructions 1445 to predict the likelihood that the real-time request belongs to a particular classification using the trained deep machine learning model 1535.

Before executing the process 1900, the trained deep machine learning model 1535, which may have been stored as an ASTORE file, may be published as indicated above. On publication, the process 1900 may be executed in the production phase. At operation 1905, the one or more processors receive a first set of variables associated with a real-time request. The first set of variables may be considered API variables, and may be similar to the API training variables discussed above. At operation 1910, the one or more processors extract a predetermined subset of the first set of variables to generate a second set of variables for the real-time request. The operation 1910 may be similar to the operation 1710.

At operation 1915, the one or more processors identify historical request data associated with a predetermined number of historical requests. The historical requests may be identified based on the real-time request of the operation 1905. The operation 1915 may be similar to the operation 1715. At operation 1920, the one or more processors compute a set of parameters based on the first set of variables and the historical request data. The operation 1920 may be similar to the operation 1720. At operation 1925, the one or more processors generate a plurality of sequences for the real-time request of the operation 1905. The plurality of sequences may include a plurality of numeric sequences as shown at operation 1930 and a plurality of string sequences as shown at operation 1935. Each of the plurality of numeric sequences and each of the plurality of string sequences may include a plurality of values of a specific attribute type. The plurality of values may be selected from the second set of variables, the set of parameters, and the historical request data. The generation of the various sequences is similar to what is described at the operation 1725.

At operation 1940, the one or more processors convert each of the plurality of string sequences into an encoded string sequence to obtain a plurality of encoded string sequences. In some embodiments, depending on the number of distinct values, either one-hot encoding may be used or random dense vectors may be used for encoding the plurality of string sequences. The encoding process is similar to what is described at the operation 1740. The one or more processors input the plurality of numeric sequences and the plurality of encoded string sequences into the trained deep machine learning model 1535 at operation 1945. At operation 1950, the one or more processors compute a score (e.g., the score 1625) from the trained deep machine learning model, the score indicative of a likelihood that the real-time request belongs to an unauthorized classification. The score (e.g., the score 1625) may be combined with the one or more rules 1625 to take action (e.g., approve the real-time request or deny the real-time request) on the real-time request.

Figure 22:
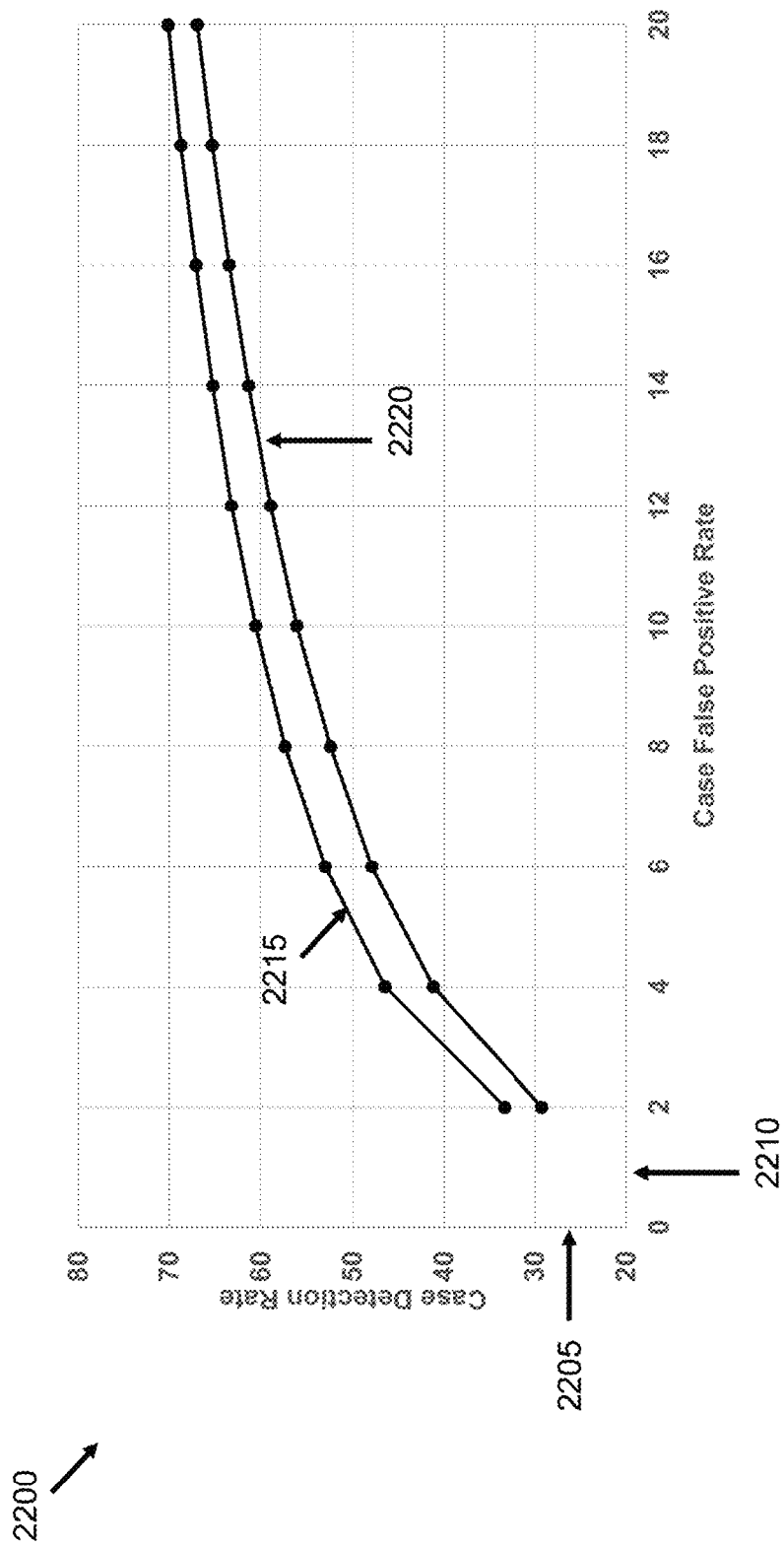
FIG. 22 is an example graph comparing case study results obtained by using the proposed approach and a traditional approach, according to embodiments of the present technology.
Figure 23:
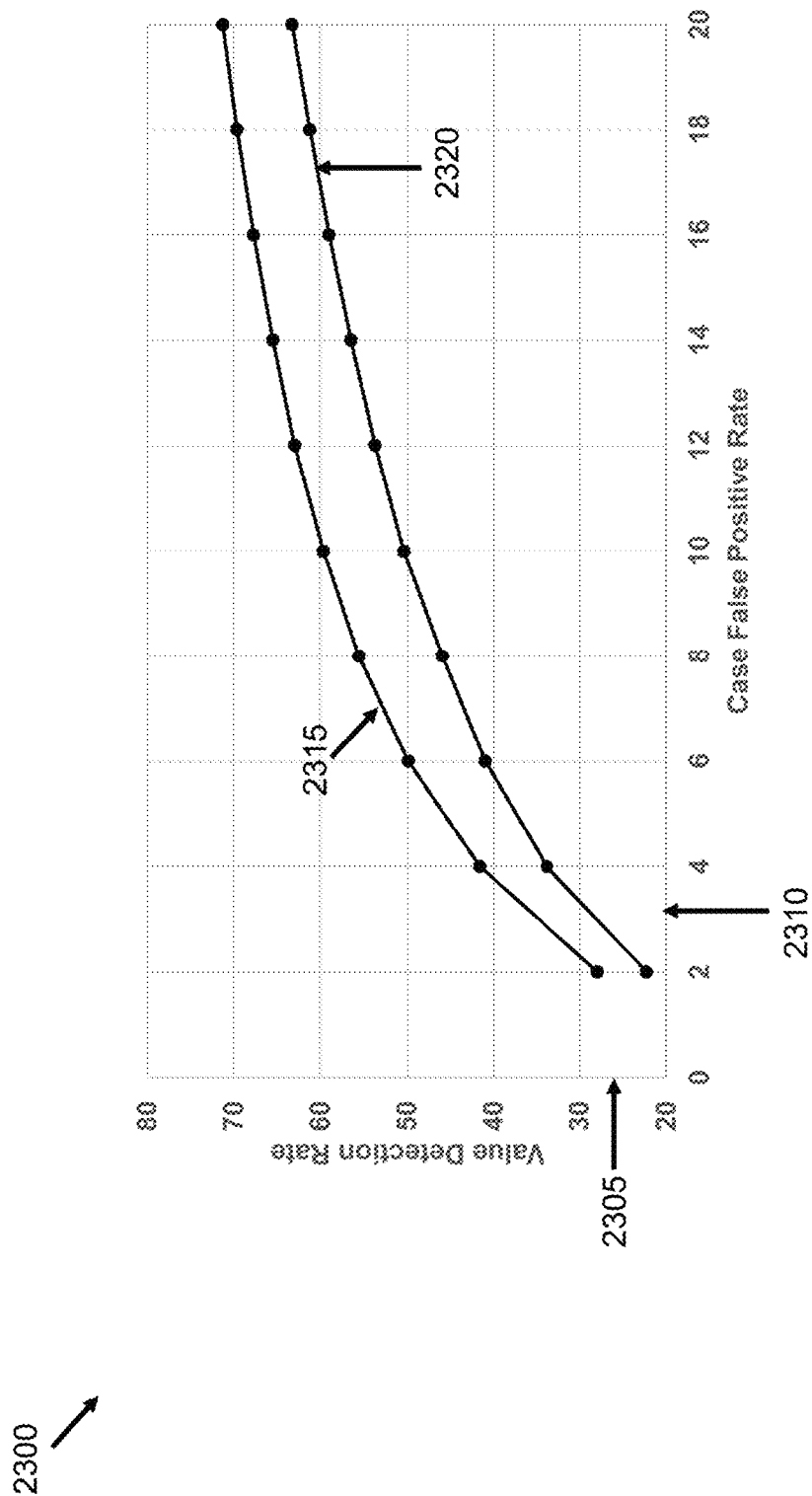
FIG. 23 is an example graph comparing additional case study results obtained by using the proposed approach and the traditional approach, according to embodiments of the present technology.
Figure 24:
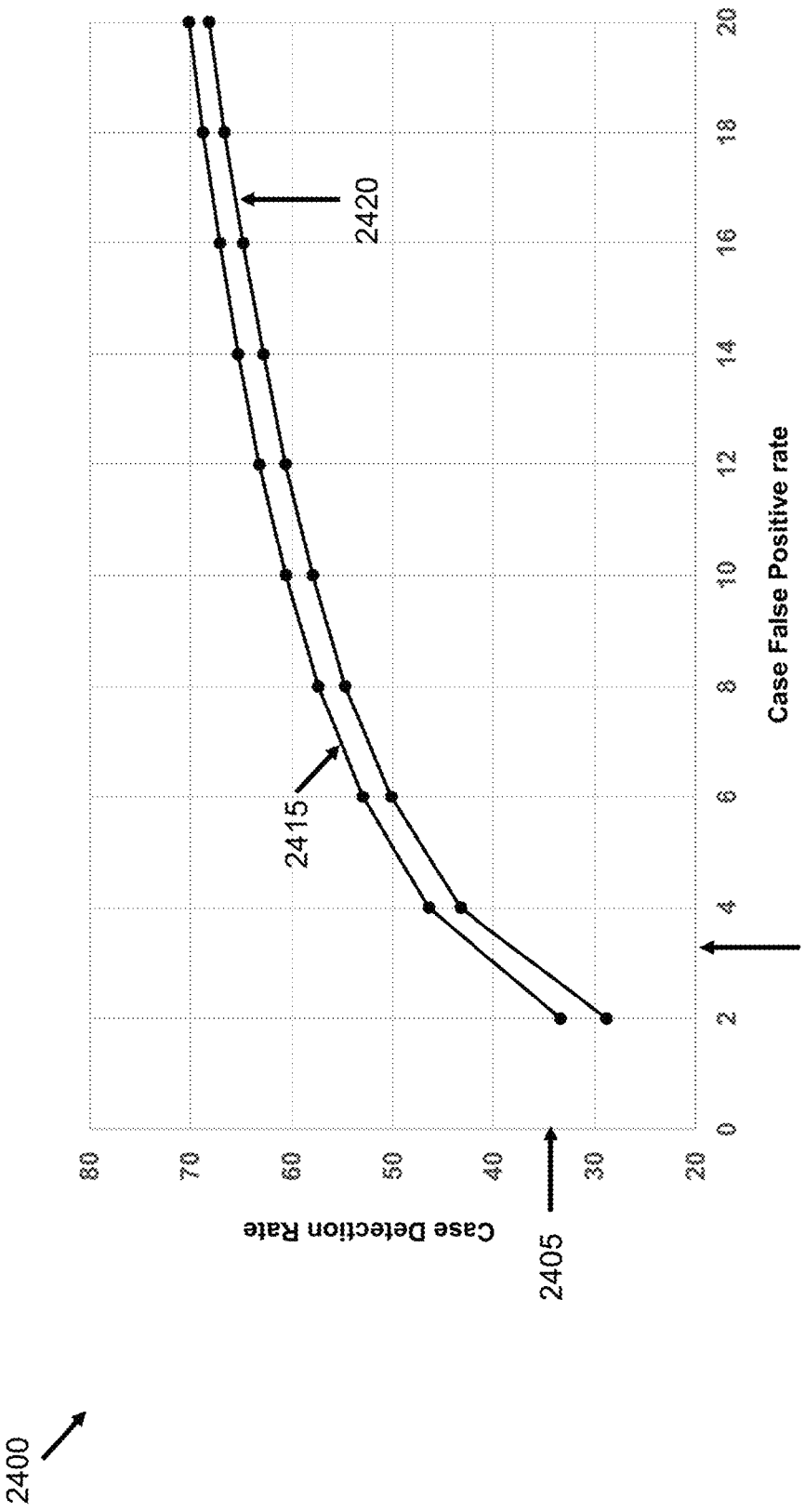
FIG. 24 is an example graph comparing yet other case study results obtained by using the proposed approach and the traditional approach, according to embodiments of the present technology.

Turning now to FIGS. 22-24, case study examples are shown, in accordance with some embodiments of the present disclosure. In particular, the case study compares results obtained by using the proposed approach described herein with results obtained by using a traditional approach (e.g., using feature engineering). The case study is based on one billion requests spanning a period of eighteen months. In other words, the deep machine learning model was trained using the data from the one billion requests. The first set of training variables (e.g., the API training variables) included around three terabytes (TB) of datasets. Ten time steps were used, meaning nine past transactions for each request were used in the case study. The case study was performed on a deep machine learning model having one input layer, one RNN layer, two dense layers between the input layer and the RNN layer, one output layer, and one dense layer between the RNN layer and the output layer. The first dense layer (e.g., between the input layer and the second dense layer) included one hundred and twenty-eight neurons. The second dense layer (e.g., between the first dense layer and the RNN layer) included sixty-four neurons. The RNN layer included thirty-two GRU units. The third dense layer (between the RNN layer and the output layer) included eight neurons. The case study was performed using parallel processing in a cloud-based run-time environment (e.g., the SAS® Cloud Analytic Services or CAS).

Referring specifically to FIG. 22, an example graph 2200 shows a Case Detection Rate (CDR) comparison between a traditional approach and the approach described herein. CDR is a performance indicator representing the percentage of detected requests that belong to a specific classification. For example, the CDR may represent the percentage of requests that belong to the unauthorized classification. The CDR is measured relative to a Case False Positive Rate (CFPR), which is the number of false alerts or false positives being generated to detect one true request that belongs to a specific classification (e.g., the unauthorized classification).

Thus, the graph 2200 plots CDR on Y-axis 2205 against CFPR on X-axis 2210. The graph 2200 includes a first plot 2215 representing the CDR/CFPR for the proposed approach herein and second plot 2220 representing the CDR/CFPR for a traditional approach. Each data point on each of the first plot 2215 and the second plot 2220 shows that for a "Y" CDR value, Y % of unauthorized requests are detected assuming the corresponding CFPR of "X." For example, at a CDR of 60 at CFPR 10, the current approach detects 60% of the unauthorized requests assuming a false positive rate of 10. As shown from the graph 2200, the first plot 2215 representing the proposed approach has a higher CDR for each corresponding CFPR than the second plot 2220. Thus, the proposed approach has a higher CDR (and therefore better performance) for a given CFPR than the traditional feature engineering approach.

FIG. 23 shows a graph 2300 plotting a Value Detection Rate (VDR) on Y-Axis 2305 against CFPR on X-Axis 2310. VDR represents the percentage amount of value (e.g., dollar amount) that may be saved or recovered that otherwise may have been lost to unauthorized requests. A first plot 2315 shows the results for the proposed approach and a second plot 2320 shows the results for the traditional approach. Each data point on each of the first plot 2315 and the second plot 2320 shows that for a given "X" CFPR, a corresponding "Y" percentage of VDR may be recovered or saved. For example, for a false positive rate of 10, the proposed approach may recover 60% of the amount that may otherwise have been lost to unauthorized requests. As shown from the graph 2300, the first plot 2315 representing the proposed approach has a higher VDR for each corresponding CFPR than the second plot 2320. Thus, the proposed approach has a higher VDR (and therefore better performance) for a given CFPR than the traditional feature engineering approach.

FIG. 24 shows a graph 2400 comparing use of API variables relative to signature variables in computing the score. The graph 2400 plots CDR on Y-Axis 2405 against CFPR on X-Axis 2410. A first plot 2415 shows the results using signature variables in computing the score and a second plot 2420 shows the results using API variables. As shown from the graph 2400, the first plot 2315 representing the proposed approach of using signature variables has a better performance than the second plot 2420.

In addition to superior scoring accuracy, the proposed approach has other advantages over the traditional feature engineering approach. For example, the proposed approach requires less time to build/train the deep machine learning model 1520 compared to the feature engineering approach. For example, the proposed approach may automatically generate the API and signature variables instead of manual creation of features by modelers in feature engineering. The proposed approach is fully automated requiring minimal manual intervention, leading to fewer errors and more robust and accurate predictions. The proposed approach is also faster than the traditional approach in computing the scores. For example, Table 3 below compares the various metrics (e.g., storage and time) of the proposed approach and the traditional feature engineering approach:

TABLE 3

|  | Traditional approach | Proposed approach |
| --- | --- | --- |
| Time to build one model | A few weeks | 13 hours |
| Disk space used | 30 TB | 400 GB |
| Modeler requirement | Experienced | Junior |
| Trimming code | Yes | No |
| Error prone | Yes | No |
| Scoring speed (one transaction) | 5 ms | 1 ms |

Thus, the proposed approach detects the likelihood that a request belongs to a particular classification. The proposed approach uses deep learning and particularly RNN or transformer model to detect classification patterns based on historical profiles, leading to better performance, shorter modeling time, less storage requirement, and easier to use model.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium having computer-readable instructions stored thereon that when executed by a processor cause the processor to:
   train a deep machine learning model to compute a training score by:
   (A) creating a set of training data associated with a plurality of training requests;
   (B) inputting the set of training data and a set of weights into the deep machine learning model to compute the training score for each of the plurality of training requests;
   (C) comparing the training score of each training request of the plurality of training requests with an expected score for that training request;
   (D) responsive to determining that the training score of a predetermined percentage of the plurality of training requests is outside a predetermined threshold of the expected score, computing a loss function;
   (E) adjusting the set of weights based on the loss function; and
   (F) repeating (A)-(E) until the training score of the predetermined percentage of the plurality of training requests is within the predetermined threshold of the expected score to obtain a trained deep machine learning model;
   receive a first set of variables associated with a real-time request;
   extract a predetermined subset of the first set of variables to generate a second set of variables for the real-time request;
   identify historical request data associated with a predetermined number of historical requests, wherein the historical requests are identified based on the real-time request;
   compute a set of parameters based on the first set of variables and the historical request data;
   generate a plurality of sequences for the real-time request, wherein the plurality of sequences comprise a plurality of numeric sequences and a plurality of string sequences, wherein each of the plurality of numeric sequences and each of the plurality of string sequences comprises a plurality of values of a specific attribute type, and wherein the plurality of values are selected from the second set of variables, the set of parameters, and the historical request data;
   convert each of the plurality of string sequences into an encoded string sequence to obtain a plurality of encoded string sequences;
   input the plurality of numeric sequences and the plurality of encoded string sequences into the trained deep machine learning model; and
   compute a score from the trained deep machine learning model, the score indicative of a likelihood that the real-time request belongs to an unauthorized classification.

2. The non-transitory computer-readable medium of claim 1, wherein the trained deep machine learning model comprises (a) an input layer to receive the plurality of numeric sequences and the plurality of encoded string sequences; (b) at least one recurrent neural network layer or at least one transformer model layer; (c) an output layer to output the score; and (d) at least one dense layer between the input layer and the at least one recurrent neural network layer or at least one transformer model layer.

3. The non-transitory computer-readable medium of claim 2, wherein the at least one dense layer between the input layer and the at least one recurrent neural network layer or at least one transformer model layer comprises at least two dense layers.

4. The non-transitory computer-readable medium of claim 2, wherein the trained deep machine learning model further comprises at least one additional dense layer between the at least one recurrent neural network layer or at least one transformer model layer and the output layer.

5. The non-transitory computer-readable medium of claim 1, wherein to convert the plurality of string sequences into the plurality of encoded string sequences, the computer-readable instructions further cause the processor to:
   determine a number of distinct values of the specific attribute type in the plurality of string sequences; and
   responsive to determining that the number of the distinct values is less than or equal to a value threshold, assign a different numeric value vector to each of the distinct values of the specific attribute type based on one-hot encoding, wherein a size of each of the numeric value vector is equal to the number of the distinct values.

6. The non-transitory computer-readable medium of claim 1, wherein to convert the plurality of string sequences into the plurality of encoded string sequences, the computer-readable instructions further cause the processor to:
   determine a number of distinct values of the specific attribute type in the plurality of string sequences; and
   responsive to determining that the number of the distinct values is greater than a value threshold, generate a unique random dense vector for each of the distinct values of the specific attribute type, wherein a size of each of the random dense vector is determined based on a square root of the number of the distinct values of the specific attribute type plus one.

7. The non-transitory computer-readable medium of claim 6, wherein a same random dense vector is assigned to a particular distinct value each time the distinct value is encountered in the plurality of string sequences.

8. The non-transitory computer-readable medium of claim 1, wherein to compute the set of parameters, the computer-readable instructions further cause the processor to compute at least one of (a) a distance between locations associated with two consecutive requests; or (b) the distance between a location of a user associated with the real-time request and a location where the real-time request was made.

9. The non-transitory computer-readable medium of claim 1, wherein the score is a positive number between 1 and 999, wherein higher the score, higher the likelihood that the real-time request belongs to the unauthorized classification.

10. The non-transitory computer-readable medium of claim 1, wherein the computer-readable instructions further cause the processor to:
apply one or more rules to the real-time request; and
approve or deny the real-time request based on the score and a result of applying the one or more rules to the real-time request.

11. The non-transitory computer-readable medium of claim 1, wherein to create the set of training data in (A), the computer-readable instructions further cause the processor to:
receive a first set of training variables associated with each of the plurality of training requests;
extract the predetermined subset of the first set of training variables to generate a second set of training variables for the each of the plurality of training requests;
for the each of the plurality of training requests, identify associated historical training request data from a plurality of historical training requests;
compute a set of training parameters based on the first set of training variables and the historical training request data for the each of the plurality of training requests;
generate a plurality of training sequences for the each of the plurality of training requests, wherein the plurality of training sequences for a training request of the plurality of training requests comprise a plurality of numeric training sequences and a plurality of string training sequences, wherein each of the plurality of numeric training sequences and each of the plurality of string training sequences for the training request comprises a plurality of training values of a specific training attribute type, and wherein the plurality of training values are selected from the second set of training variables, the set of training parameters, and the historical training request data; and
convert each of the plurality of string training sequences into an encoded string training sequence to obtain a plurality of encoded string training sequences, wherein the plurality of numeric training sequences and the plurality of encoded string training sequences are input into the deep machine learning model in (B).

12. The non-transitory computer-readable medium of claim 1, wherein to adjust the set of weights in (E), the computer-readable instructions further cause the processor to:
compute a sub-gradient based on the loss function to determine whether to increase or decrease a weight value of the set of weights;
compute a bias based on the loss function to determine a step size of how much to increase or decrease the weight value of the set of weights; and
adjust the set of weights in (E) based on the sub-gradient and bias.

13. A system comprising:
a memory having computer-readable instructions stored thereon; and
a processor that executes the computer-readable instructions to:
train a deep machine learning model to compute a training score by:
(A) creating a set of training data associated with a plurality of training requests;
(B) inputting the set of training data and a set of weights into the deep machine learning model to compute the training score for each of the plurality of training requests;
(C) comparing the training score of each training request of the plurality of training requests with an expected score for that training request;
(D) responsive to determining that the training score of a predetermined percentage of the plurality of training requests is outside a predetermined threshold of the expected score, computing a loss function;
(E) adjusting the set of weights based on the loss function; and
(F) repeating (A)-(E) until the training score of the predetermined percentage of the plurality of training requests is within the predetermined threshold of the expected score to obtain a trained deep machine learning model;
receive a first set of variables associated with a real-time request;
extract a predetermined subset of the first set of variables to generate a second set of variables for the real-time request;
identify historical request data associated with a predetermined number of historical requests, wherein the historical requests are identified based on the real-time request;
compute a set of parameters based on the first set of variables and the historical request data;
generate a plurality of sequences for the real-time request, wherein the plurality of sequences comprise a plurality of numeric sequences and a plurality of string sequences, wherein each of the plurality of numeric sequences and each of the plurality of string sequences comprises a plurality of values of a specific attribute type, and wherein the plurality of values are selected from the second set of variables, the set of parameters, and the historical request data;
convert each of the plurality of string sequences into an encoded string sequence to obtain a plurality of encoded string sequences;
input the plurality of numeric sequences and the plurality of encoded string sequences into the trained deep machine learning model; and
compute a score from the trained deep machine learning model, the score indicative of a likelihood that the real-time request belongs to an unauthorized classification.

14. The system of claim 13, wherein the trained deep machine learning model comprises (a) an input layer to receive the plurality of numeric sequences and the plurality of encoded string sequences; (b) at least one recurrent neural network layer or at least one transformer model layer; (c) an output layer to output the score; and (d) at least one dense layer between the input layer and the at least one recurrent neural network layer or at least one transformer model layer.

15. The system of claim 14, wherein the at least one dense layer between the input layer and the at least one recurrent neural network layer or at least one transformer model layer comprises at least two dense layers.

16. The system of claim 14, wherein the trained deep machine learning model further comprises at least one additional dense layer between the at least one recurrent neural network layer or at least one transformer model layer and the output layer.

17. The system of claim 13, wherein to convert the plurality of string sequences into the plurality of encoded string sequences, the computer-readable instructions further cause the processor to:
  determine a number of distinct values of the specific attribute type in the plurality of string sequences; and
  responsive to determining that the number of the distinct values is less than or equal to a value threshold, assign a different numeric value vector to each of the distinct values of the specific attribute type based on one-hot encoding, wherein a size of each of the numeric value vector is equal to the number of the distinct values; or
  responsive to determining that the number of the distinct values is greater than the value threshold, generate a unique random dense vector for each of the distinct values of the specific attribute type, wherein the size of each of the random dense vector is determined based on a square root of the number of the distinct values of the specific attribute type plus one, and wherein a same random dense vector is assigned to a particular distinct value each time the distinct value is encountered in the plurality of string sequences.

18. The system of claim 13, wherein to compute the set of parameters, the computer-readable instructions cause the processor to compute at least one of (a) a distance between locations associated with two consecutive requests; or (b) the distance between a location of a user associated with the real-time request and a location where the real-time request was made.

19. The system of claim 13, wherein the score is a positive number between 1 and 999, and wherein higher the score, higher the likelihood that the real-time request belongs to the unauthorized classification.

20. The system of claim 12, wherein the computer-readable instructions further cause the processor to:
  apply one or more rules to the real-time request; and
  approve or deny the real-time request based on the score and a result of applying the one or more rules to the real-time request.

21. The system of claim 13, wherein to create the set of training data in (A), the computer-readable instructions further cause the processor to:
  receive a first set of training variables associated with each of the plurality of training requests;
  extract the predetermined subset of the first set of training variables to generate a second set of training variables for the each of the plurality of training requests;
  for the each of the plurality of training requests, identify associated historical training request data from a plurality of historical training requests;
  compute a set of training parameters based on the first set of training variables and the historical training request data for the each of the plurality of training requests;
  generate a plurality of training sequences for the each of the plurality of training requests, wherein the plurality of training sequences for a training request of the plurality of training requests comprise a plurality of numeric training sequences and a plurality of string training sequences, wherein each of the plurality of numeric training sequences and each of the plurality of string training sequences for the training request comprises a plurality of training values of a specific training attribute type, and wherein the plurality of training values are selected from the second set of training variables, the set of training parameters, and the historical training request data; and
  convert each of the plurality of string training sequences into an encoded string training sequence to obtain a plurality of encoded string training sequences, wherein the plurality of numeric training sequences and the plurality of encoded string training sequences are input into the deep machine learning model in (B).

22. The system of claim 13, wherein to adjust the set of weights in (E), the computer-readable instructions further cause the processor to:
  compute a sub-gradient based on the loss function to determine whether to increase or decrease a weight value of the set of weights;
  compute a bias based on the loss function to determine a step size of how much to increase or decrease the weight value of the set of weights; and
  adjust the set of weights in (E) based on the sub-gradient and bias.

23. A method comprising:
  training, by a processor executing computer-readable instructions stored on a memory, a deep machine learning model to compute a training score by:
    (A) creating, by the processor, a set of training data associated with a plurality of training requests;
    (B) inputting, by the processor, the set of training data and a set of weights into the deep machine learning model to compute the training score for each of the plurality of training requests;
    (C) comparing, by the processor, the training score of each training request of the plurality of training requests with an expected score for that training request;
    (D) responsive to determining that the training score of a predetermined percentage of the plurality of training requests is outside a predetermined threshold of the expected score, computing, by the processor, a loss function;
    (E) adjusting, by the processor, the set of weights based on the loss function; and
    (F) repeating, by the processor, (A)-(E) until the training score of the predetermined percentage of the plurality of training requests is within the predetermined threshold of the expected score to obtain a trained deep machine learning model;
  receiving, by the processor, a first set of variables associated with a real-time request;
  extracting, by the processor, a predetermined subset of the first set of variables for generating a second set of variables for the real-time request;
  identifying, by the processor, historical request data associated with a predetermined number of historical requests, wherein the historical requests are identified based on the real-time request;
  computing, by the processor, a set of parameters based on the first set of variables and the historical request data;

generating, by the processor, a plurality of sequences for the real-time request, wherein the plurality of sequences comprise a plurality of numeric sequences and a plurality of string sequences, wherein each of the plurality of numeric sequences and each of the plurality of string sequences comprises a plurality of values of a specific attribute type, and wherein the plurality of values are selected from the second set of variables, the set of parameters, and the historical request data;

converting, by the processor, each of the plurality of string sequences into an encoded string sequence for obtaining a plurality of encoded string sequences;

inputting, by the processor, the plurality of numeric sequences and the plurality of encoded string sequences into the trained deep machine learning model; and computing, by the processor, a score from the deep machine learning model, the score indicative of a likelihood that the real-time request belongs to an unauthorized classification.

24. The method of claim 23, wherein the trained deep machine learning model comprises (a) an input layer to receive the plurality of numeric sequences and the plurality of encoded string sequences; (b) at least one recurrent neural network layer or at least one transformer model layer; (c) an output layer to output the score; and (d) at least one dense layer between the input layer and the at least one recurrent neural network layer or at least one transformer model layer.

25. The method of claim 24, wherein the at least one dense layer between the input layer and the at least one recurrent neural network layer or at least one transformer model layer comprises at least two dense layers, and wherein the trained deep machine learning model further comprises at least one additional dense layer between the at least one recurrent neural network layer or at least one transformer model layer and the output layer.

26. The method of claim 23, wherein for converting the plurality of string sequences into the plurality of encoded string sequences, the method further comprises:

determining, by the processor, a number of distinct values of the specific attribute type in the plurality of string sequences; and responsive to determining that the number of the distinct values is less than or equal to a value threshold, assigning, by the processor, a different numeric value vector to each of the distinct values of the specific attribute type based on one-hot encoding, wherein a size of each of the numeric value vector is equal to the number of the distinct values; or responsive to determining that the number of the distinct values is greater than a value threshold, generating, by the processor, a unique random dense vector for each of the distinct values of the specific attribute type, wherein the size of each of the random dense vector is determined based on a square root of the number of the distinct values of the specific attribute type plus one, and wherein a same random dense vector is assigned to a particular distinct value each time the distinct value is encountered in the plurality of string sequences.

27. The method of claim 23, wherein for computing the set of parameters, the method further comprises computing, by the processor, at least one of (a) a distance between locations associated with two consecutive requests; or (b) the distance between a location of a user associated with the real-time request and a location where the real-time request was made.

28. The method of claim 23, wherein the score is a positive number between 1 and 999, and wherein higher the score, higher the likelihood that the real-time request belongs to the unauthorized classification.

29. The method of claim 23, further comprising:

applying, by the processor, one or more rules to the real-time request; and approving or denying, by the processor, the real-time request based on the score and a result of applying the one or more rules to the real-time request.

30. The method of claim 23, wherein for creating the set of training data in (A), the method further comprises:

receiving, by the processor, a first set of training variables associated with each of the plurality of training requests;

extracting, by the processor, the predetermined subset of the first set of training variables for generating a second set of training variables for the each of the plurality of training requests;

for the each of the plurality of training requests, identifying, by the processor, associated historical training request data from a plurality of historical training requests;

computing, by the processor, a set of training parameters based on the first set of training variables and the historical training request data for the each of the plurality of training requests;

generating, by the processor, a plurality of training sequences for the each of the plurality of training requests, wherein the plurality of training sequences for a training request of the plurality of training requests comprise a plurality of numeric training sequences and a plurality of string training sequences, wherein each of the plurality of numeric training sequences and each of the plurality of string training sequences for the training request comprises a plurality of training values of a specific training attribute type, and wherein the plurality of training values are selected from the second set of training variables, the set of training parameters, and the historical training request data; and converting, by the processor, each of the plurality of string training sequences into an encoded string training sequence to obtain a plurality of encoded string training sequences, wherein the plurality of numeric training sequences and the plurality of encoded string training sequences are input into the deep machine learning model in (B).

\* \* \* \* \*